United States Patent
Vanam et al.

(10) Patent No.: US 10,044,913 B2
(45) Date of Patent: Aug. 7, 2018

(54) TEMPORAL FILTER FOR DENOISING A HIGH DYNAMIC RANGE VIDEO

(71) Applicant: VID SCALE, INC., Wilmington, DE (US)

(72) Inventors: Rahul Vanam, San Diego, CA (US); Yuriy Reznik, Seattle, WA (US)

(73) Assignee: VID SCALE, INC., Wilmington, DE (US)

( * ) Notice: Subject to any disclaimer, the term of this patent is extended or adjusted under 35 U.S.C. 154(b) by 0 days.

(21) Appl. No.: 14/441,205

(22) PCT Filed: Nov. 6, 2013

(86) PCT No.: PCT/US2013/068752
§ 371 (c)(1),
(2) Date: May 7, 2015

(87) PCT Pub. No.: WO2014/074601
PCT Pub. Date: May 15, 2014

(65) Prior Publication Data
US 2015/0288856 A1 Oct. 8, 2015

Related U.S. Application Data

(60) Provisional application No. 61/723,715, filed on Nov. 7, 2012.

(51) Int. Cl.
*H04N 5/21* (2006.01)
*H04N 9/64* (2006.01)
(Continued)

(52) U.S. Cl.
CPC .............. *H04N 5/21* (2013.01); *G06K 9/4652* (2013.01); *G06T 5/00* (2013.01); *G06T 5/002* (2013.01);
(Continued)

(58) Field of Classification Search
CPC ...... H04N 5/21; H04N 19/117; H04N 19/167; H04N 19/186; H04N 19/85; H04N 9/643;
(Continued)

(56) References Cited

U.S. PATENT DOCUMENTS 9,350,963 B2 5/2016 Yin et al.
2001/0052971 A1 12/2001 Tsuchiya et al.
(Continued)

FOREIGN PATENT DOCUMENTS

CN 101141655 A 3/2008
CN 101262559 A 9/2008
(Continued)

OTHER PUBLICATIONS

Bystrom et al., "Efficient Mode Selection for H.264 Complexity Reduction in a Bayesian Framework", Signal Processing, Image Communication, Nov. 13, 2007, pp. 71-86.
(Continued)

*Primary Examiner* — Michael Teitelbaum
(74) *Attorney, Agent, or Firm* — Condo Roccia Koptiw LLP

(57) ABSTRACT

Systems, methods, and instrumentalities are disclosed for denoising high dynamic range video using a temporal filter. A frame of an uncompressed video stream may be received. The frame may include a plurality of pixels. It may be determined that a chroma component of a pixel of the plurality of pixels belongs to a predefined region. The region may be predefined on the basis of one or more chroma components. The predefined region may be a CbCr space. The chroma component of the pixel may be compared with a chroma component of a co-located pixel to determine if the chroma component of the co-located pixel belongs to the predefined region. The pixel may be filtered using a denoising filter. The denoising filter may be a temporal filter. The
(Continued)

denoising filter may be a Crawford filter. The uncompressed video stream including the filtered pixel may be encoded.

14 Claims, 17 Drawing Sheets

(51) Int. Cl.
*G06T 5/00* (2006.01)
*H04N 19/117* (2014.01)
*H04N 19/186* (2014.01)
*H04N 19/167* (2014.01)
*H04N 19/85* (2014.01)
*G06K 9/46* (2006.01)
*G06T 7/90* (2017.01)

(52) U.S. Cl.
CPC ............. *G06T 7/90* (2017.01); *H04N 9/643* (2013.01); *H04N 9/646* (2013.01); *H04N 19/117* (2014.11); *H04N 19/167* (2014.11); *H04N 19/186* (2014.11); *H04N 19/85* (2014.11); *G06T 2207/10016* (2013.01); *G06T 2207/10024* (2013.01); *G06T 2207/20012* (2013.01); *G06T 2207/20182* (2013.01)

(58) Field of Classification Search
CPC .. H04N 9/646; G06T 7/90; G06T 5/00; G06T 5/002; G06T 2207/10016; G06T 2207/10024; G06T 2207/20012; G06T 2207/20182; G06K 9/4652
See application file for complete search history.

(56) References Cited

U.S. PATENT DOCUMENTS

| | | | |
|---|---|---|---|
| 2002/0140864 A1 | 10/2002 | Herman et al. | |
| 2004/0179743 A1 | 9/2004 | Shibata et al. | |
| 2005/0030315 A1 | 2/2005 | Cohen et al. | |
| 2005/0185836 A1 | 8/2005 | Huang | |
| 2007/0025615 A1 | 2/2007 | Zhou et al. | |
| 2007/0236609 A1 | 10/2007 | Pathak et al. | |
| 2009/0109238 A1* | 4/2009 | Yin | H04N 9/68 345/600 |
| 2009/0201320 A1 | 8/2009 | Damberg et al. | |
| 2009/0278961 A1* | 11/2009 | Mohanty | G06T 5/50 348/241 |
| 2009/0324121 A1 | 12/2009 | Bhagavathy et al. | |

FOREIGN PATENT DOCUMENTS

| | | |
|---|---|---|
| CN | 101536031 A | 9/2009 |
| JP | 10-153981 A | 6/1998 |
| JP | 2002-222416 A | 8/2002 |
| JP | 2006-157239 A | 6/2006 |
| JP | 2012-100066 A | 5/2012 |
| KR | 10-2010-0111747 A | 10/2010 |
| WO | WO 1999/045713 A1 | 9/1999 |
| WO | WO 2011/011542 A1 | 1/2011 |

OTHER PUBLICATIONS

Deng et al., "Noise Reduction Prefiltering for Video Compression", EE398, Stanford University, Jan. 1, 2006, pp. 1-5.
Lowe et al., "TimeScapes: The Movie", Available at http://timescapes.org/4k/about_the_movie.aspx, Release date: 2012, 4 pages.
Reinhard et al., "High Dynamic Range Imaging: Acquisition, Display, and Image-Based Lighting", Morgan Kaufmann, 2005, 522 pages.
Walsh, Kevin J., "RGB to Color Name Mapping (Triplet and Hex)", Available at http://web.njit.edu/~walsh/rgb.html, 2010, 27 pages.
Zafarifar et al., "Blue Sky Detection for Content-based Television Picture Quality Enhancement", IEEE, Consumer Electronics, ICCE 2007, Digest of Technical Papers, Jan. 1, 2007, 2 pages.

* cited by examiner

TEMPORAL FILTER FOR DENOISING A HIGH DYNAMIC RANGE VIDEO

CROSS-REFERENCE TO RELATED APPLICATIONS

This application is the National Stage Entry under 35 U.S.C. § 371 of Patent Cooperation Treaty Application No. PCT/US2013/068752, filed Nov. 6, 2013, which claims the benefit of U.S. Provisional Patent Application No. 61/723,715, filed Nov. 7, 2012, the contents of which are hereby incorporated by reference herein.

BACKGROUND

Temporal noise (e.g., region-specific temporal noise) may appear in a video sequence due to many factors, such as but not limited to features of content production and the preparation process. For example, temporal noise may be the result of a composition of videos shot using different cameras or under different lighting conditions, etc.

When encoding content with temporally varying noise, an encoder may consider the noise to be a high frequency component that may be preserved. The encoder may allocate bits to encode the noise. This may reduce the bits that are available to encode the remaining regions of the video, which may result in a lower visual quality at fixed bitrate. There may be a need for a denoising filter for denoising a high dynamic range video.

SUMMARY

Systems, methods, and instrumentalities are disclosed for denoising high dynamic range video using a temporal filter. Described are methods comprising receiving a frame of a video stream, the frame comprising a plurality of pixels, determining if a chroma component of a pixel of the plurality of pixels is within a predefined region of chrominance color space, and applying a denoising filter to the pixel if the chroma component of the pixel is within the predefined region of chrominance color space. Also described are methods comprising receiving a frame of a video stream, the frame comprising a plurality of pixels, determining if a chroma component of a pixel of the plurality of pixels is within a predefined region of chrominance color space, determining if a chroma component of a co-located pixel in a previous frame of the video stream is within the predefined region of chrominance color space, and applying a denoising filter to the pixel if the chroma component of the pixel is within the predefined region of chrominance color space and the chroma component of the co-located pixel in the previous frame of the video stream is within the predefined region of chrominance color space. Also described are methods comprising receiving a frame of a video stream, the frame comprising a plurality of pixels, comparing a chroma component of a pixel of the plurality of pixels with a chroma component of a co-located pixel in a previous frame of the video stream, and applying a denoising filter to the pixel if the difference between the chroma component of the pixel and the chroma component of the co-located pixel in the previous frame of the video stream is less than a predefined distance (r), which may be within a predefined region of chrominance color space. Also described are video devices, comprising a processor, wherein the processor is configured to receive a frame of a video stream, the frame comprising a plurality of pixels, determine if a chroma component of a pixel of the plurality of pixels is within a predefined region of chrominance color space, and apply a denoising filter to the pixel if the chroma component of the pixel is within the predefined region of chrominance color space.

DETAILED DESCRIPTION

Implementations described herein may provide an approach for filtering temporal noise in a high dynamic range (HDR) video stream. An HDR camera may capture several images at different exposures. The HDR camera may combine the images to generate a single image, e.g., the single image may accurately represent the intensity range found in a given scene. An HDR video camera may capture a diverse range of intensities in a scene that may not be normally captured by a regular video camera. For example, HDR cameras may capture stars during day light.

An HDR video camera may introduce temporally varying noise that may be detrimental to the overall visual quality.

For example, segments corresponding to sky from two consecutive frames may exhibit a difference (e.g., Luma difference), which may create temporal noise that may appear as speckles or "salt and pepper noise." Temporal noise (e.g., region-specific temporal noise) may appear due to one or more factors, such as those created in content production and preparation process. For example, temporal noise may be the result of a composition of videos shot using different cameras or under different lighting conditions, etc.

Implementations may be extended to selectively denoise one or more regions-of-interest (ROI) in a video stream. Implementations may provide an approach for denoising HDR videos, and for example, may be extended to filter noise in a ROI of a video stream, such as but not limited to, blue sky, foliage, etc. A filter may be used as a preprocessing step to an encoder. The resulting bitstream may have better visual quality as compared to unfiltered compressed video at a fixed bitrate. A preprocessing filter may aid an encoder in saving bits and improving visual quality by providing information, such as but not limited to ROI information, which may be used for bit allocation, motion estimation, etc. Tools and applications for such tools for improving effectiveness of video coding may be provided. Denoising an entire frame may be provided. Temporal filtering across an input frame may be provided.

Figure 1:
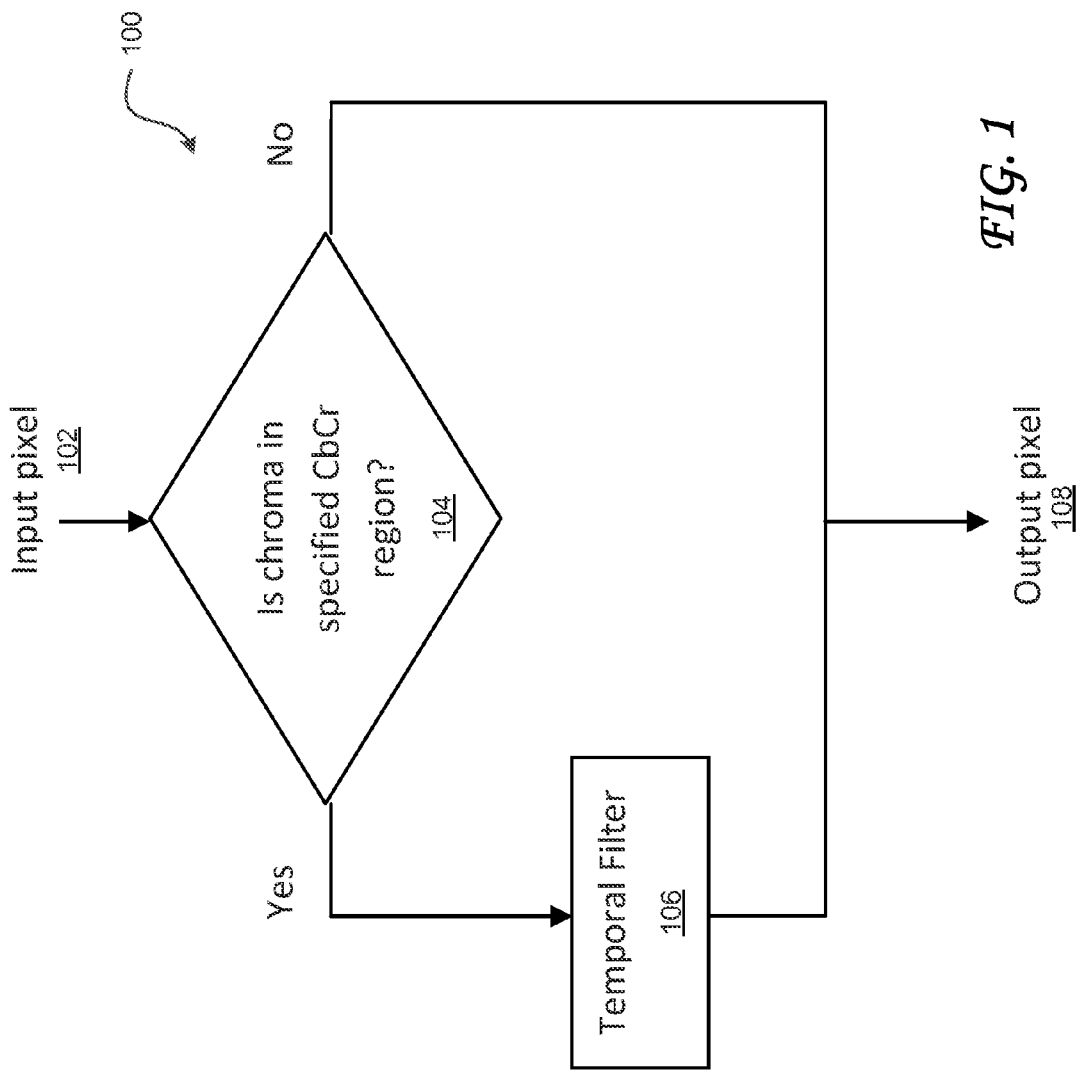
FIG. 1 is a diagram illustrating an example of a denoising implementation.

FIG. 1 is a diagram illustrating an example of a denoising implementation 100. For example, for an input pixel 102, a check may be performed to determine whether the chroma of input pixel 102 belongs to a condition 104 (e.g., a specified region in the CbCr space). A temporal filter may be applied 106 (e.g., only applied) to pixels satisfying the condition 104 (e.g., those pixels that are within the specified region in the CbCr space). An output pixel 108 may be filtered if the condition 104 is met. An output pixel 108 may not be filtered if the condition 104 is not met.

Filtering decision implementations may be provided. Constraints for temporal filtering may be defined, for example, to ensure that temporal filtering may be applied across pixels having similar chroma. For an input pixel in the current frame, a co-located pixel in a previous frame may be used to define conditions to decide whether the current pixel may be filtered. For example, conditions in the CbCr space may be defined.

Figure 2:
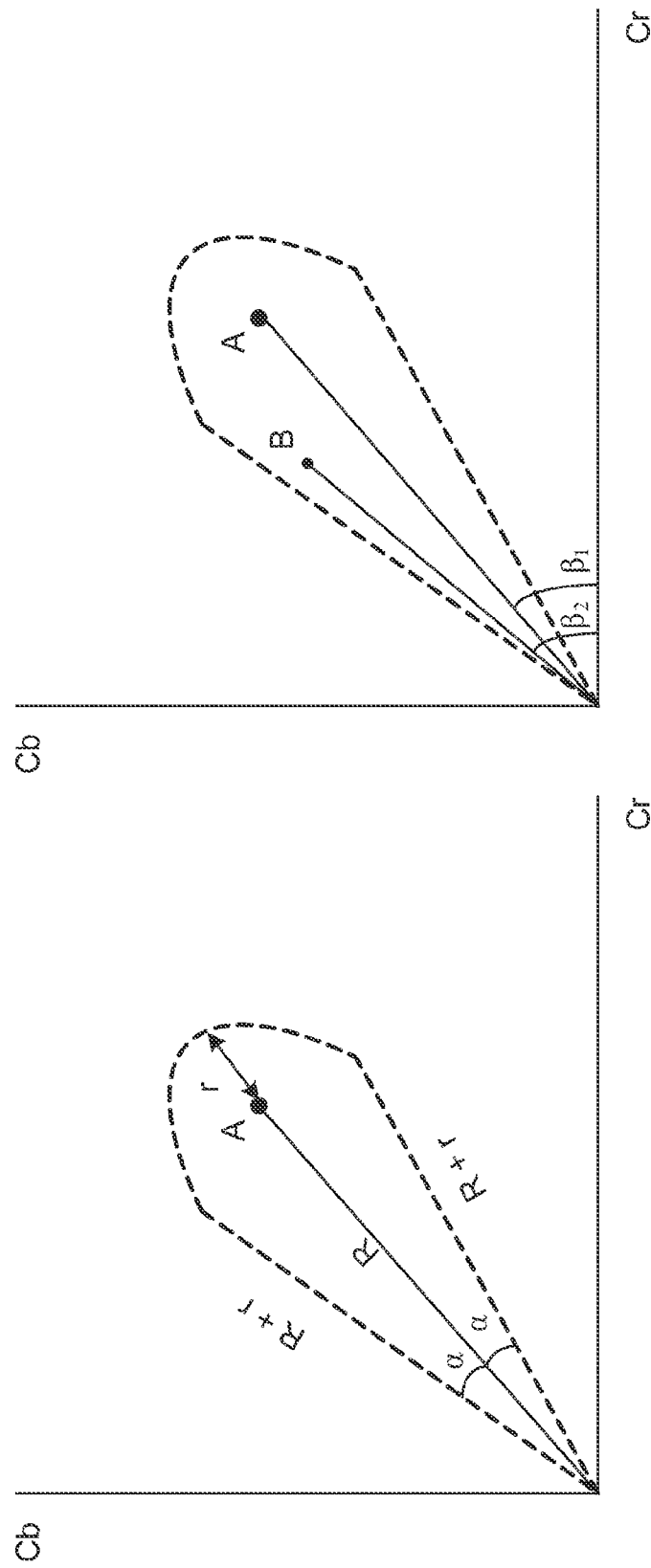
FIG. 2A is a diagram illustrating a chroma for a co-located previous pixel "A" and a chromatographic region around A.
FIG. 2B is a diagram illustrating a chroma for a pixel "B" in a current frame compared to the chroma of co-located previous pixel "A" in a chromatographic region around A.

FIGS. 2A and 2B are diagrams illustrating an example filtering decision process. FIG. 2A is a diagram illustrating an example filtering process where "A" may represent the chroma for a co-located previous pixel (e.g., in a previous frame) and the dotted region around A may be used to determine if a pixel in a current frame may be filtered. FIG. 2B is a diagram illustrating an example filtering process where "B" may represent the chroma of the pixel in the current frame. Since the chroma of the pixel in the current frame lies within the dotted region, the pixel may be filtered. For example, "B" and "A" may be the current and collocated pixels, respectively. For example, the chroma of A and B may be ($Cb_a$, $Cr_a$) and ($Cb_b$, $Cr_b$), respectively. A region around pixel A in the CbCr space may be defined.

The region may define a constraint for filtering B, for example, as illustrated in FIG. 2A. The parameters r, R, and α may be the parameters of the region, where $R = \sqrt{Cb_a^2 + Cr_a^2}$. If B lies in the region, for example as illustrated in FIG. 2B, then temporal filtering may be applied. If not, then temporal filtering may not be applied.

Figure 3:
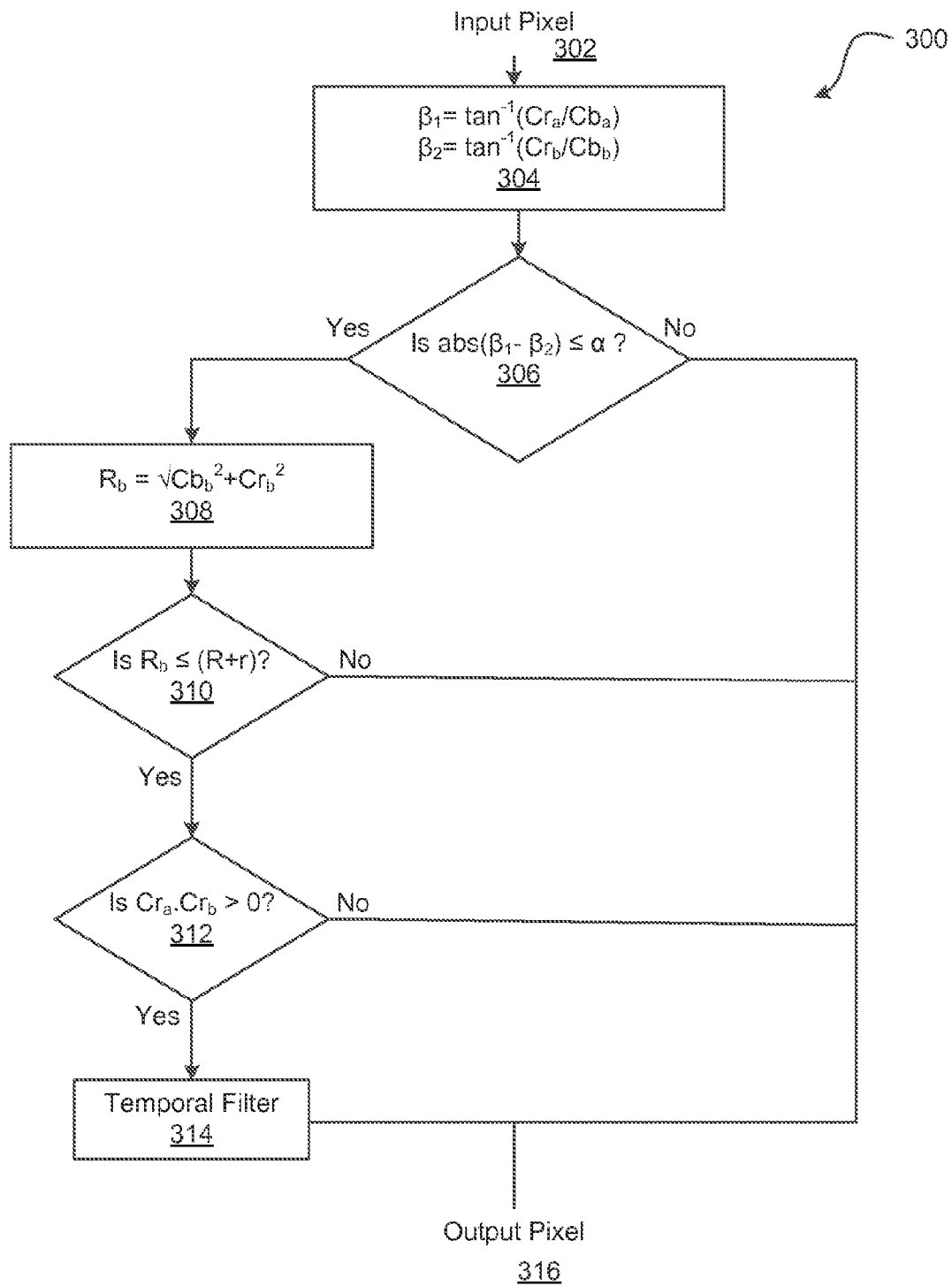
FIG. 3 is a diagram illustrating a temporal filtering decision process.

FIG. 3 is a diagram illustrating temporal filtering 300. An input pixel (e.g., FIG. 2B "B") 302 is compared against a co-located pixel (e.g., FIG. 2B "A") in a previous frame of a video stream. Angles $\beta_1$ and $\beta_2$ are calculated at 304. A check 306 determines if the absolute value of the difference between β1 and β2 is less than or equal to parameter α (FIG. 2A). If not, the output pixel 316 is not filtered. If the absolute value of the difference between β1 and β2 is less than or equal to parameter α (e.g., FIG. 2A), $R_b$ is calculated 308. A check 310 determines if $R_b$ is less than or equal to the sum of parameter R (e.g., FIG. 2A) plus parameter r (e.g., FIG. 2A). If not, the output pixel 316 is not filtered. If Rb is less than or equal to the sum of parameter R plus parameter r, a check 312 determines whether the product of $Cr_a$ and $Cr_b$ is greater than zero. If not, the output pixel 316 is not filtered. If the product of Cra and Crb is greater than zero, a temporal filter 314 may be applied. For example, the temporal filter may be based on the Crawford filler. The temporal filter may operate on luminance pixels (e.g., only luminance pixels).

Figure 4:
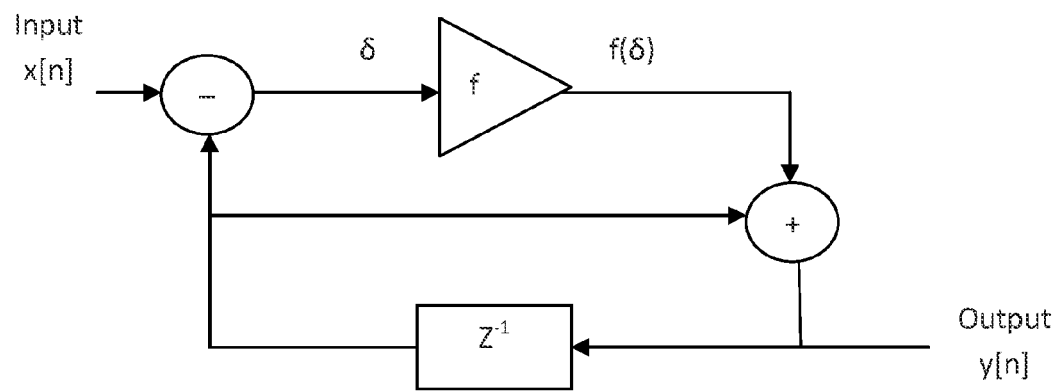
FIG. 4 is a diagram illustrating an example of a Crawford filter.

FIG. 4 is a diagram illustrating an example of a Crawford filter. The difference δ may be computed between a pixel in a current frame and a co-located pixel in a previous frame. A nonlinear transfer function may be applied on δ. For example:

$$f(\delta) = \delta \left(1 - e^{-\left(\frac{|\delta|}{\tau}\right)^\gamma}\right),$$

where γ and τ may be filter parameters that may determine the sharpness of cutoff and filter threshold, respectively.

Implementations for denoising a ROI (e.g., a sky region) in an HDR video may be provided. A temporal filter, for example, the example Crawford filter described herein, may be utilized. Denoising by detecting sky blue pixels may be provided.

Figure 5:
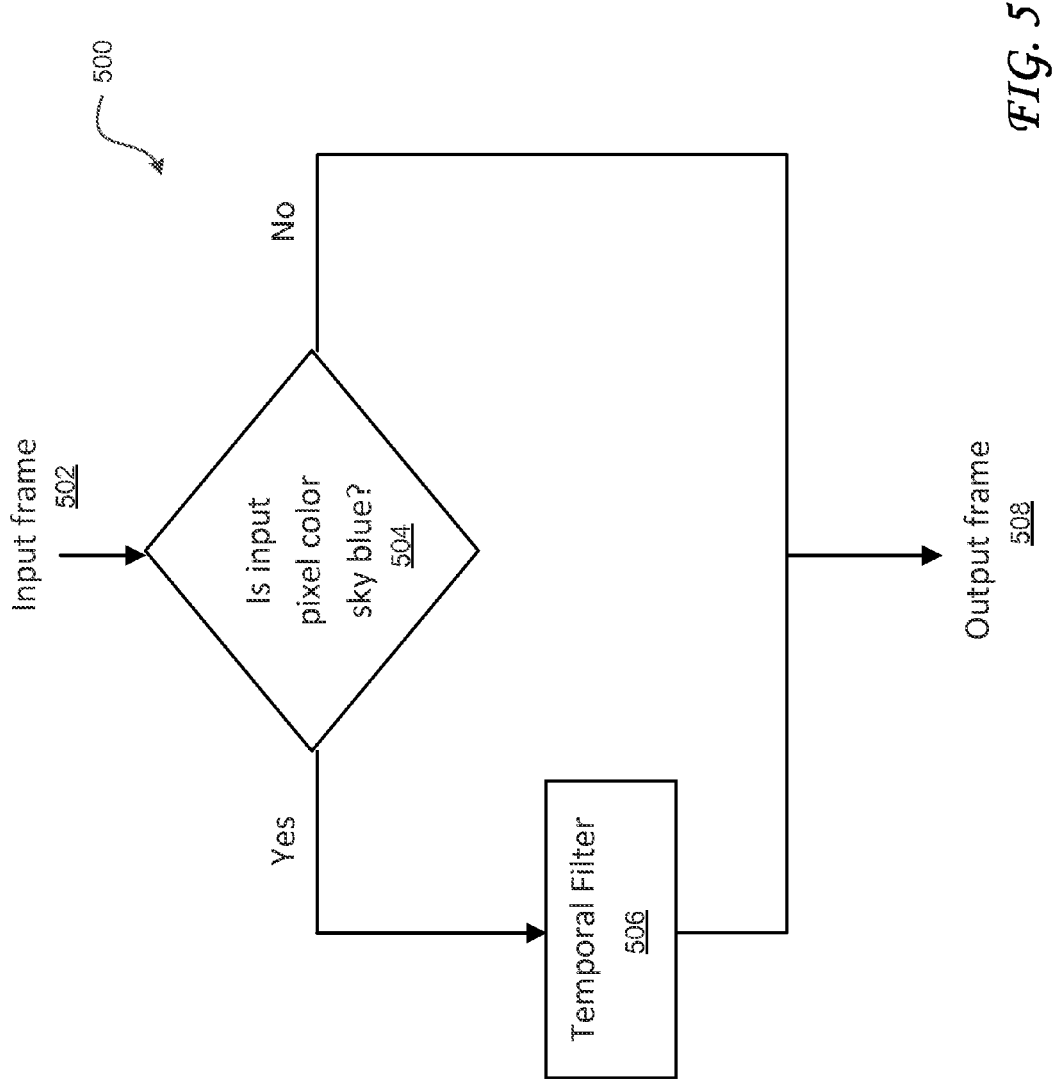
FIG. 5 is a diagram illustrating a temporal filtering decision process for denoising a sky region.

FIG. 5 is a diagram illustrating an example of a denoising implementation for a color region, e.g., sky region 500. An input pixel 502 (e.g., a pixel associated with an input frame) is received. A check 504 is performed to determine whether the input pixel 502 belongs to the color region, e.g., whether the input pixel 502 is sky blue. For example, chrominance components (e.g., Cb and Cr) of a pixel may be utilized to determine whether or not the pixel belongs to a shade of sky blue. Table 1 lists an example of RGB and YCbCr values of different shades of sky blue.

TABLE 1

Example of Different shades of sky blue and their associated RGB and YCbCr values

| Color name | R | G | B | Y | Cb | Cr |
|---|---|---|---|---|---|---|
| Light Sky Blue | 135 | 206 | 250 | 0.7611 | 0.1182 | −0.1471 |
| Light Sky Blue 1 | 176 | 226 | 255 | 0.8528 | 0.0793 | −0.1033 |
| Light Sky Blue 2 | 164 | 211 | 238 | 0.7959 | 0.0741 | −0.0970 |
| Light Sky Blue 3 | 141 | 182 | 205 | 0.6861 | 0.0635 | −0.0845 |
| Light Sky Blue 4 | 96 | 123 | 139 | 0.4644 | 0.0435 | −0.0558 |
| Deep Sky Blue 1 | 0 | 191 | 255 | 0.6079 | 0.2113 | −0.3860 |
| Deep Sky Blue 2 | 0 | 178 | 238 | 0.5666 | 0.1976 | −0.3598 |
| Deep Sky Blue 3 | 0 | 154 | 205 | 0.4900 | 0.1692 | −0.3111 |
| Deep Sky Blue 4 | 0 | 104 | 139 | 0.3310 | 0.1154 | −0.2102 |
| Skyblue | 135 | 206 | 255 | 0.7625 | 0.1280 | −0.1480 |
| Skyblue 1 | 126 | 192 | 238 | 0.7109 | 0.1199 | −0.1377 |
| Skyblue 2 | 108 | 166 | 205 | 0.6137 | 0.1025 | −0.1207 |
| Skyblue 3 | 74 | 112 | 139 | 0.4152 | 0.0700 | −0.0794 |
| Skyblue 4 | 50 | 153 | 204 | 0.5286 | 0.1463 | −0.2111 |

For example, as shown in Table 1, Cb and Cr for sky blue may be within an approximate ranges of [0.04, 0.3] and [−0.01, −0.4], respectively. If the input pixel 502 is sky blue, a temporal filter 506 may be applied, and the output pixel 508 in such cases is filtered. If the input pixel 502 is not sky blue, a temporal filter 506 may not be applied, and the output pixel 508 in such cases is not filtered.

A portion of the noise in a sky region may be generated by stars in the sky that may mostly have [Cb, Cr]=[0,0]. The chroma component for the noise generated by stars may be included in the range for detection. Pixels may be classified as sky blue pixels, for example, if the following inequalities are satisfied.

$$Cb \geq 0, Cr \leq 0,$$

$$Cb \geq -0.1 Cr.\quad\text{Equation (1)}$$

Figure 6:
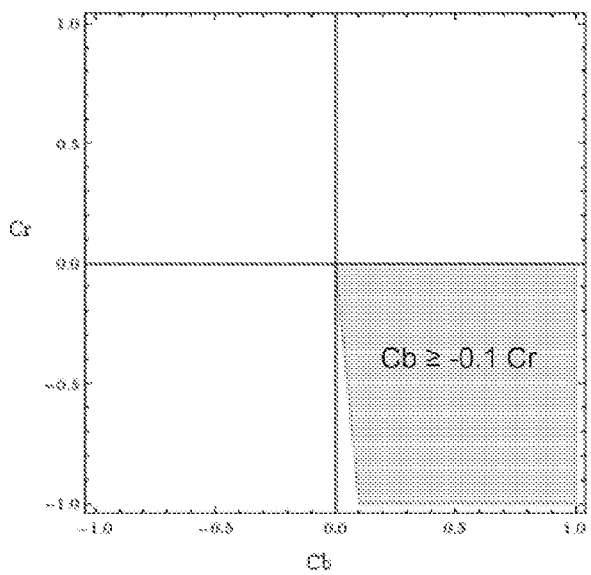
FIG. 6 is a diagram illustrating an example of a Cb vs. Cr plot ere the shaded region indicates shades of sky blue.

FIG. 6 is a diagram illustrating an example of a Cb vs. Cr plot where the shaded region indicates shades of sky blue as defined in Equation 1. For example, the region in CbCr color space covered by this inequality may be illustrated in the lower right section of the diagram of FIG. 6. Pixels satisfying this inequality may be filtered using a temporal filter. Denoising implementations that utilize current and co-located sky blue pixels may be provided.

Figure 7:
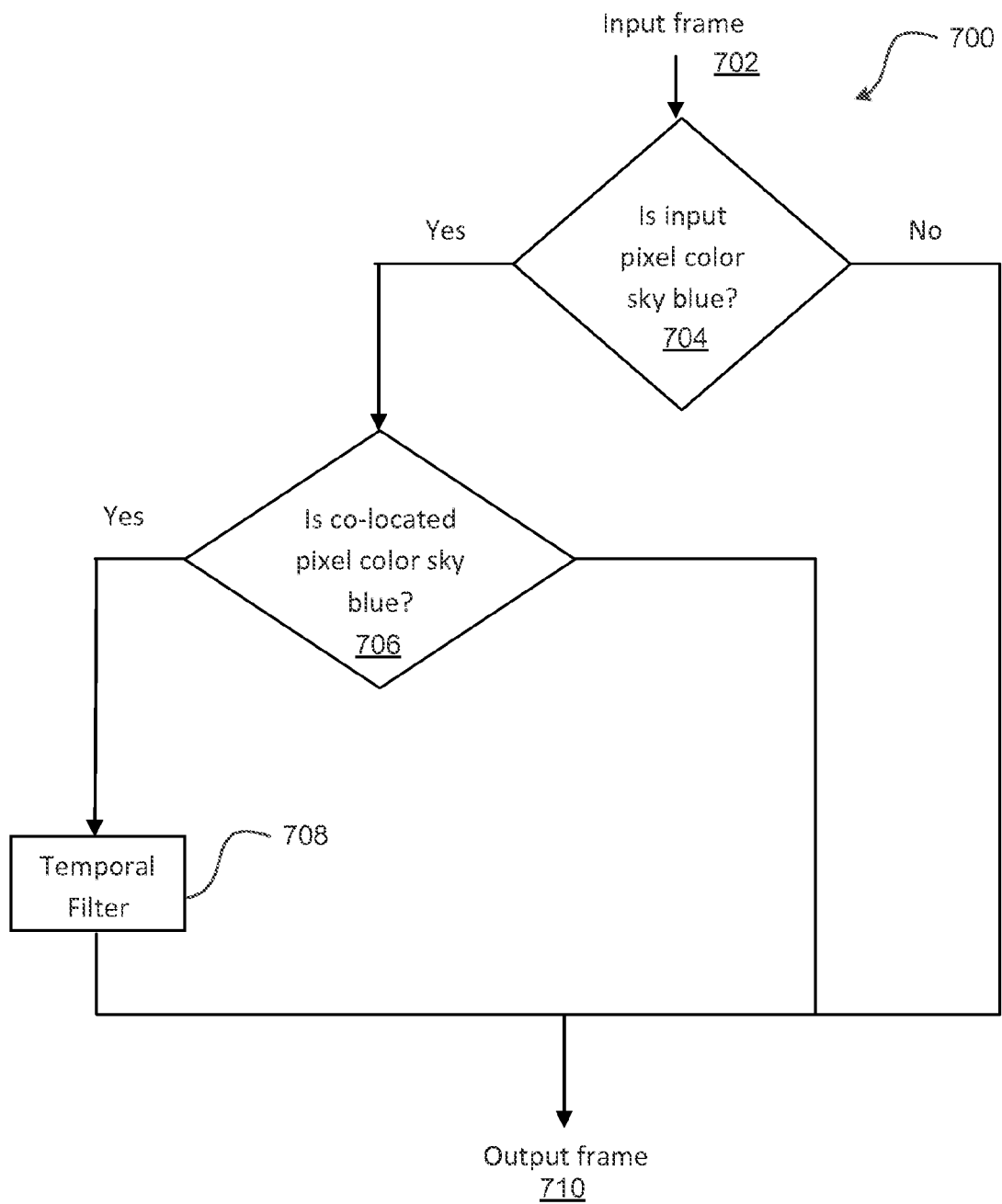
FIG. 7 is a diagram illustrating a temporal filtering decision process.

FIG. 7 is a diagram illustrating an example of a denoising implementation 700 performed using a temporal filter 708. An input frame 702 has a region of interest containing an input pixel, and a check 704 is implemented whether the input pixel lies in a color region, e.g., whether the input pixel is sky blue. If not, the pixel in the corresponding output frame 710 is not filtered. When filtering a pixel, a previous co-located pixel (e.g., a co-located pixel in a previous frame) may not be sky blue. To avoid using pixels belonging to different colors, a check 706 may be performed to determine whether the co-located pixel is sky blue. For example, the check may be performed utilizing the conditions defined in Equation (1). If the pixel and the co-located pixel are sky blue, a temporal filter 708 may be applied to the pixel. The filtered pixel may be in corresponding output frame 710.

Denoising a color region (e.g., a sky region) by adapting one or more parameters of a temporal filter may be provided. For example, in fast moving scenes where objects may be moving against a sky background, the boundary of an object may include a pixel that may be a shade of sky blue. When current pixels belonging to the sky region are filtered using sky blue pixels from the boundary of an object (e.g., an object boundary), a false contouring artifact may result in the filtered frame. Implementations to prevent such artifacts may be provided.

Figure 8:
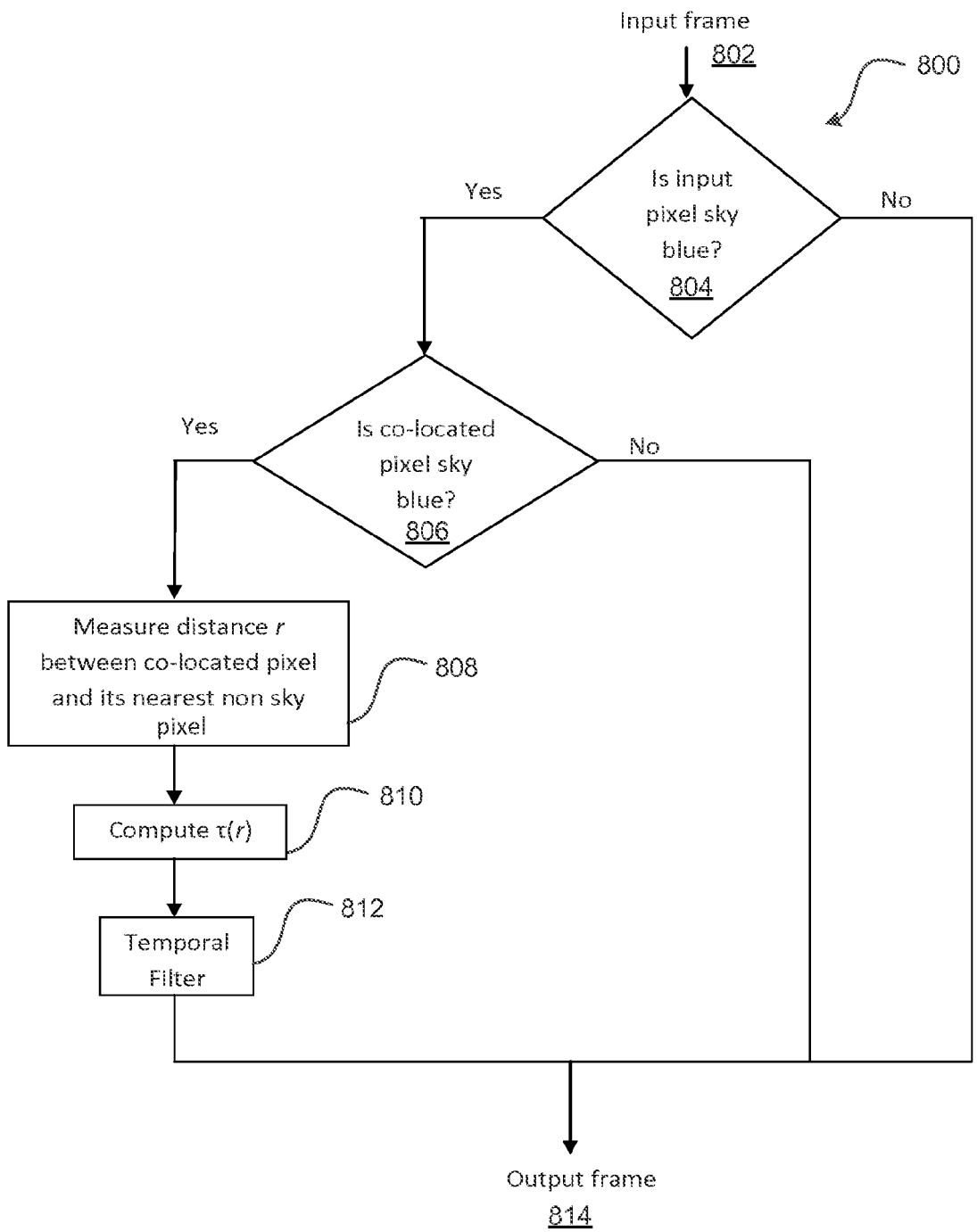
FIG. 8 is a diagram illustrating a temporal filtering decision process to reduce artifacts.

FIG. 8 is a diagram illustrating an example of a temporal filter implementation 800. Temporal filter implementation 800 may mitigate false contouring artifacts. An input frame 802 may have a region of interest containing an input pixel, and a check 804 may be performed to determine whether the input pixel is sky blue. If not, the pixel in the corresponding output frame 814 is not filtered. If so, a check 806 may be performed to determine whether the co-located pixel is sky blue. If not, the pixel in the corresponding output frame 814 is not filtered.

If the pixel and the co-located pixel are sky blue, a distance "r" is determined between the co-located pixel and its nearest non sky pixel 808. Parameter $\tau$ based on the distance of a co-located pixel from the nearest non-sky blue pixel is computed 810. For example, a 32×32 pixel search window may be utilized. The distance r to a filter parameter $\tau$ may be mapped, for example, using the following equation:

$$\tau(r) = 1 + K \log(r)$$

where K may be a constant scale factor. The above equation may yield smaller values of $\tau$ for smaller values of r. If both the pixel and the co-located pixel are sky blue, a temporal filter 812 may be applied to the pixel, which may be filtered in corresponding output frame 814.

Figure 9:
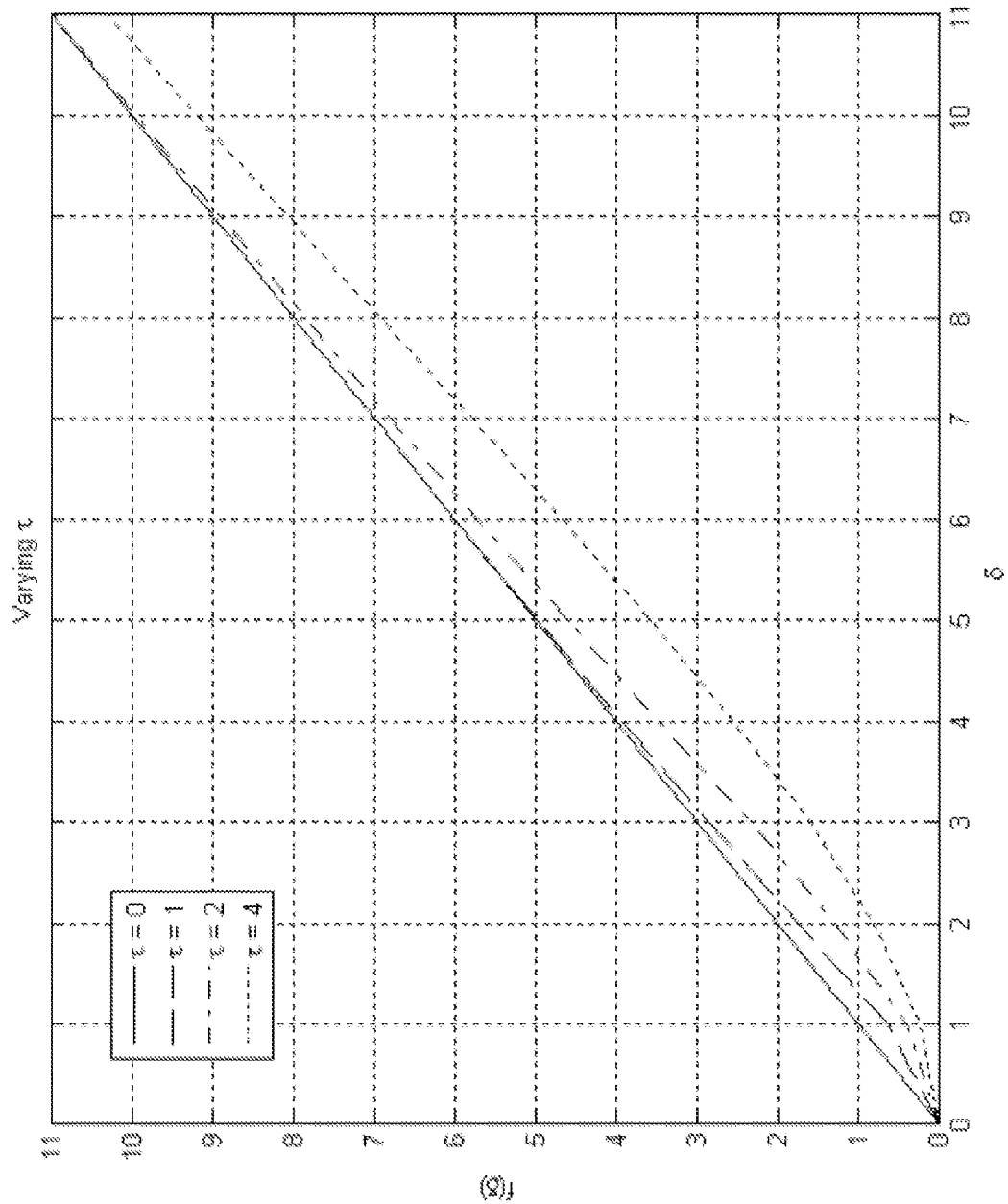
FIG. 9 is a diagram illustrating an example of the relationship between $\delta$ and $f(\delta)$ for different values of $\tau$.

FIG. 9 is a diagram illustrating an example of the relationship between $\delta$ and $f(\delta)$ for different values of $\tau$. For example, FIG. 9 may exemplify the relationship between $\delta$ and $f(\delta)$ for different $\tau$ when $\gamma$ is set to one. For smaller $\tau$, $f(\delta) \approx \delta$, which may result in an output of $y[n] \approx x[n]$, which may corresponds to milder filtering. Such implementations may provide that when co-located pixels are very close to a non-sky region, a milder temporal filter may be used. The use of a milder temporal filter may mitigate the occurrence of contouring artifacts.

The Crawford filter parameters $\gamma$ and $\tau$ may be varied. $\gamma=1$ and $\tau=4$ may yield a desired denoised output. Consecutive denoised frames may have a desirable difference image corresponding to the original frame. The difference image, for example, may have lower temporal noise (e.g., significantly lower temporal noise) when compared to the difference image obtained from original images.

Applications of denoising filter for video compression may be provided. When encoding content with temporally varying noise, an encoder may consider noise to be a high frequency component that may need to be preserved. The encoder may allocate one or more bits to encode the noise, which, for example, may reduce the bits that may be available to encode the remaining regions of the video, resulting in a lower visual quality at a fixed bitrate.

Figure 10:
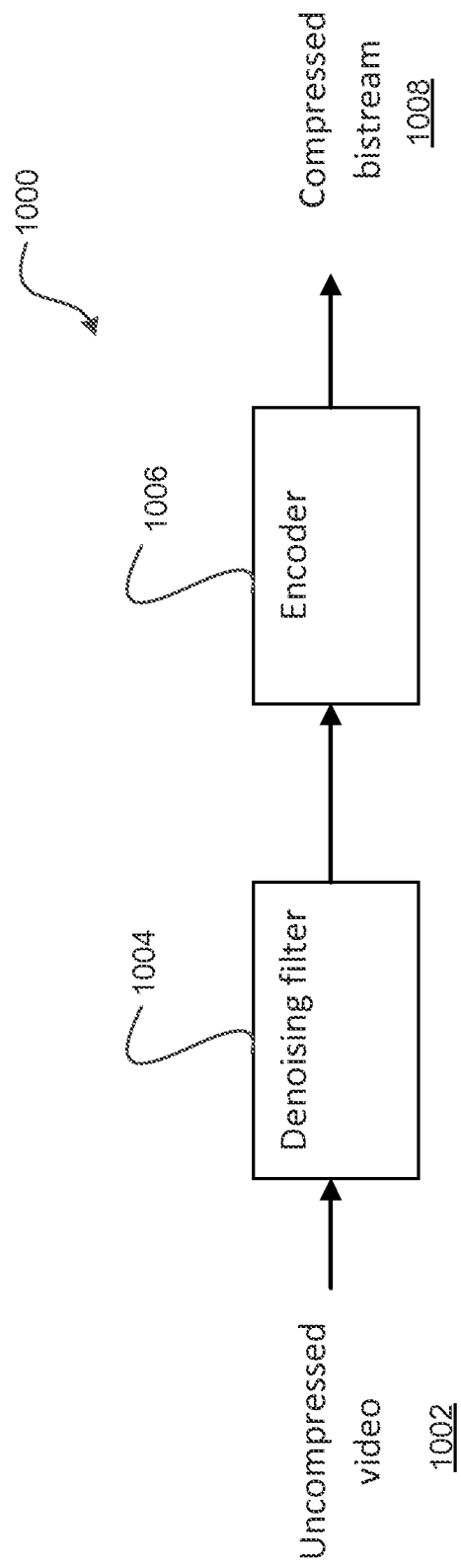
FIG. 10 is a diagram illustrating implementation of a denoising filter.

FIG. 10 is a diagram illustrating an example of a process 1000 of denoising a video stream. Uncompressed video 1002 may be applied to a denoising filter 1004. Certain pixels of the uncompressed video may be filtered, for example, as described herein. The denoising filter 1004 may be used as a preprocessing step to an encoder 1006, that may produce a compressed bitstream 1008. Using a denoising filter 1004, for example as a preprocessing step shown in FIG. 10, may reduce the bits allocated to noise. This may result in better visual quality.

The denoising filter 1004 may be used to aid the performance of the encoder 1006. For example, if the denoising filter 1004 determines the sky region, then the denoising filter may relay this information to the encoder 1006. Since the sky region tends to be substantially homogeneous (e.g., including few details with low temporal variation), the encoder 1006 may reduce the number of bits used, for example, by encoding macroblocks belonging to the sky region as skip macroblocks.

Figure 11:
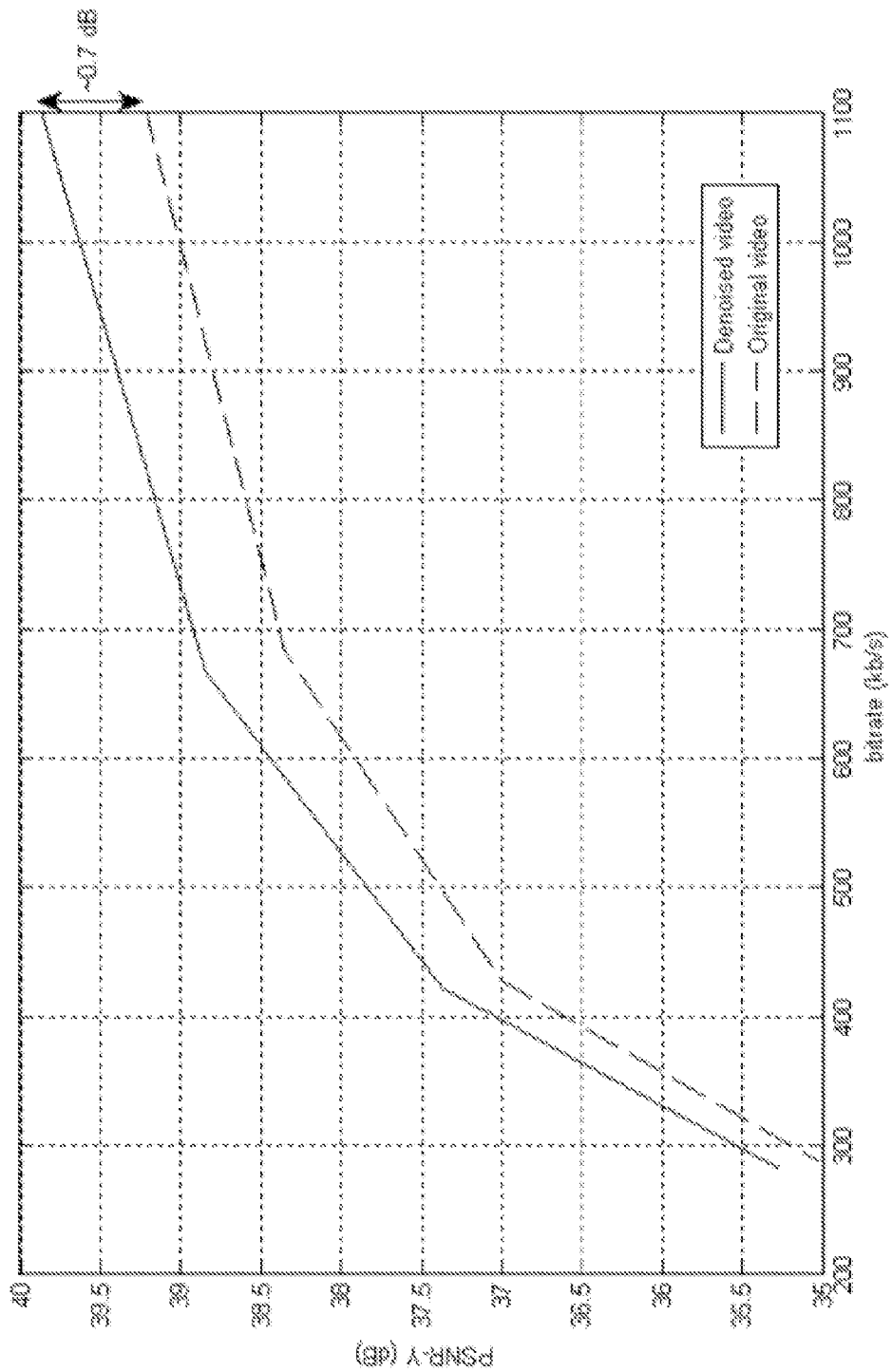
FIG. 11 is a diagram illustrating an RD plot.

For example, the x264 encoder's rate-distortion (RD) performance may be analyzed when using the denoising preprocessing filter prior to encoding. This may be compared to a case with no pre-filtering. A segment of video including 341 frames may be used as the test video. The segment may be encoded at four different quantization parameters (e.g., equal to [30, 34, 38, 42]), for example, using a high profile x264 encoder. FIG. 11 is a diagram illustrating an example of the resulting RD plot. The RD plot of FIG. 11 exemplifies that with the use of a denoising filter, the encoder's PSNR may improve by up to 0.7 dB (e.g., at higher bitrates).

Figure 12:
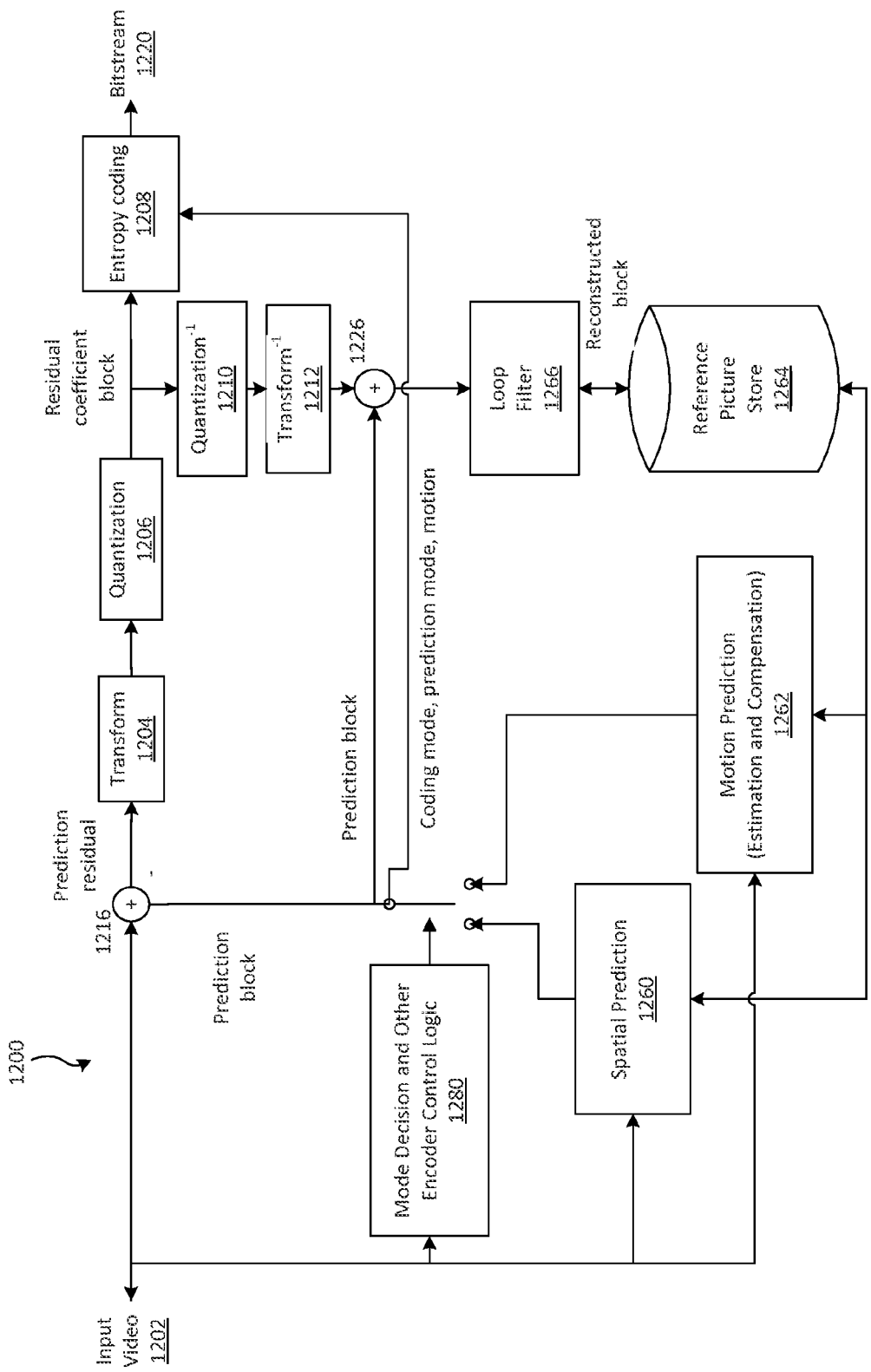
FIG. 12 is a block diagram illustrating an example of a block-based video encoder.

FIG. 12 is a block diagram illustrating an example of a block-based video encoder, for example, a hybrid video encoding system. The video encoder 1200 may receive an input video signal 1202. The input video signal 1202 may be processed block by block. A video block may be of any size. For example, the video block unit may include 16×16 pixels. A video block unit of 16×16 pixels may be referred to as a macroblock (MB). In High Efficiency Video Coding (HEVC), extended block sizes (e.g., which may be referred to as a coding unit or CU) may be used to efficiently compress high resolution (e.g., 1080p and beyond) video signals. In HEVC, a CU may be up to 64×64 pixels. A CU may be partitioned into prediction units (PUs), for which separate prediction methods may be applied.

For an input video block (e.g., a MB or a CU), spatial prediction 1260 and/or temporal prediction 1262 may be performed. Spatial prediction (e.g., "intra prediction") may use pixels from already coded neighboring blocks in the same video picture/slice to predict the current video block. Spatial prediction may reduce spatial redundancy inherent in the video signal. Temporal prediction (e.g., "inter prediction" or "motion compensated prediction") may use pixels from already coded video pictures (e.g., which may be referred to as "reference pictures") to predict the current video block. Temporal prediction may reduce temporal redundancy inherent in the video signal. A temporal prediction signal for a video block may be signaled by one or more motion vectors, which may indicate the amount and/or the direction of motion between the current block and its prediction block in the reference picture. If multiple reference pictures are supported (e.g., as may be the case for H.264/AVC and/or HEVC), then for a video block, its reference picture index may be sent. The reference index may be used to identify from which reference picture in the reference picture store 164 (e.g., which may be referred to as a decoded picture buffer or DPB) the temporal prediction signal comes.

The mode decision block 1280 in the encoder may select a prediction mode, for example, after spatial and/or temporal prediction. The prediction block may be subtracted from the current video block at 1216. The prediction residual may be transformed 1204 and/or quantized 1206. The quantized residual coefficients may be inverse quantized 1210 and/or inverse transformed 1212 to form the reconstructed residual, which may be added back to the prediction block 1226 to form the reconstructed video block.

In-loop filtering (e.g., a deblocking filter, a sample adaptive offset, an adaptive loop filter, and/or the like) may be applied 1266 to the reconstructed video block before it is put in the reference picture store 1264 and/or used to code future video blocks. The video encoder 1200 may output an output video stream 1220. To form the output video bitstream 1220, a coding mode (e.g., inter prediction mode or intra prediction mode), prediction mode information, motion information, and/or quantized residual coefficients may be sent to the entropy coding unit 1208 to be compressed and/or packed to form the bitstream.

Figure 13:
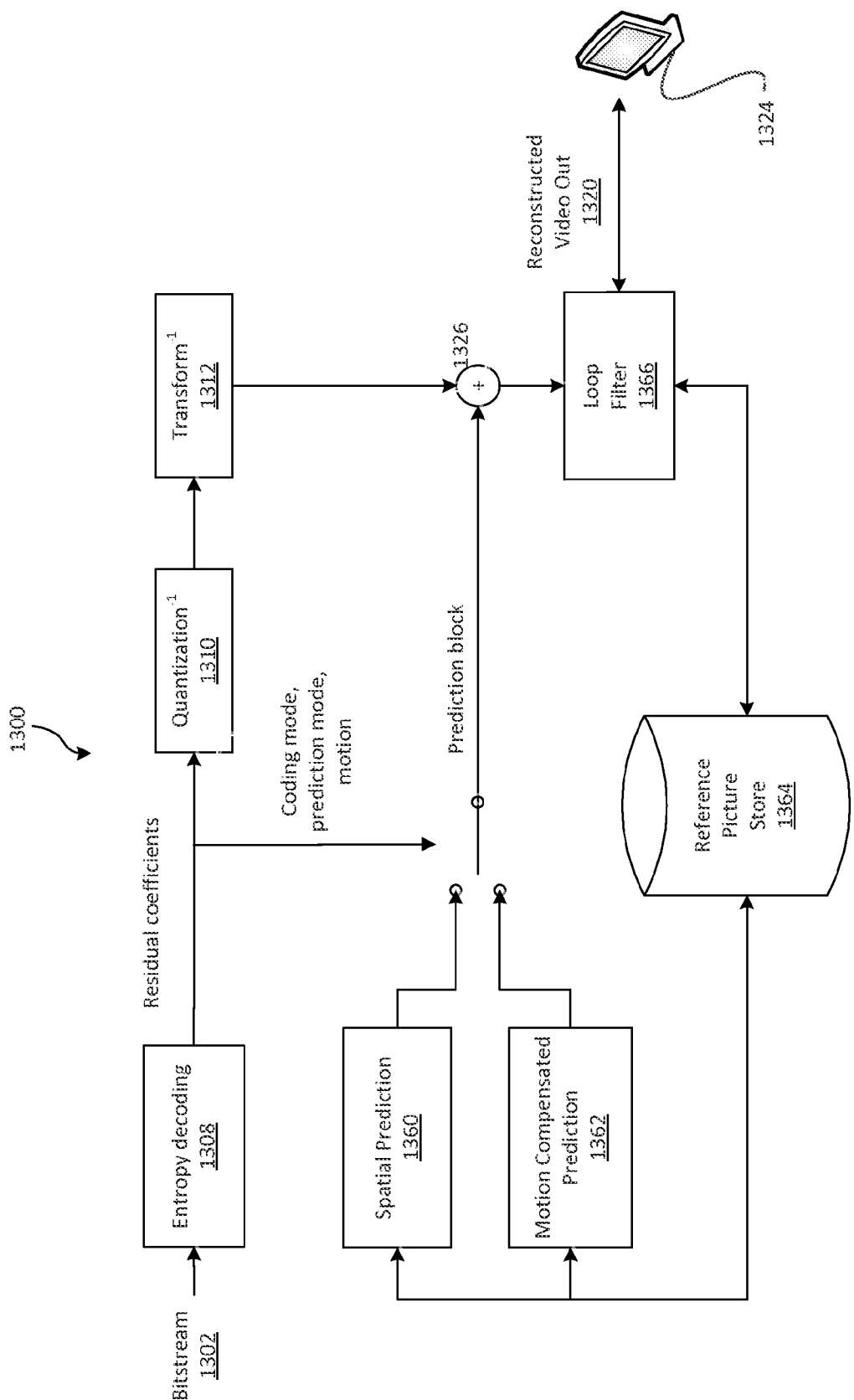
FIG. 13 is a block diagram illustrating an example of a block-based video decoder.

FIG. 13 is a block diagram illustrating an example of a block-based video decoder. The video decoder 1300 may receive a video bitstream 1302. The video bitstream 1302 may be unpacked and/or entropy decoded at entropy decoding unit 1308. The coding mode and/or prediction information used to encode the video bitstream may be sent to the spatial prediction unit 1360 (e.g., if intra coded) and/or the temporal prediction unit 1362 (e.g., if inter coded) to form a prediction block. If inter coded, the prediction information may comprise prediction block sizes, one or more motion vectors (e.g., which may indicate direction and amount of motion), and/or one or more reference indices (e.g., which may indicate from which reference picture the prediction signal is to be obtained).

Motion compensated prediction may be applied by the temporal prediction unit 1362 to form the temporal prediction block. The residual transform coefficients may be sent to an inverse quantization unit 1310 and an inverse transform unit 1312 to reconstruct the residual block. The prediction block and the residual block may be added together at 1326. The reconstructed block may go through in-loop filtering before it is stored in reference picture store 1364. The reconstructed video in the reference picture store 1364 may be used to drive a display device and/or used to predict future video blocks. The video decoder 1300 may output a reconstructed video signal 1320 to be received by a device 1324.

A single layer video encoder may take a single video sequence input and generate a single compressed bit stream transmitted to the single layer decoder. A video codec may be designed for digital video services (e.g., such as but not limited to sending TV signals over satellite, cable and terrestrial transmission channels). With video centric applications deployed in heterogeneous environments, multi-layer video coding technologies may be developed as an extension of the video coding standards to enable various applications. For example, scalable video coding technologies may be designed to handle more than one video layer where each layer may be decoded to reconstruct a video signal of a particular spatial resolution, temporal resolution, fidelity, and/or view. Although a single layer encoder and decoder are described with reference to FIG. 12 and FIG. 13, the concepts described herein may utilize a multi-layer encoder and decoder, for example, for multi-layer or scalable coding technologies.

Figure 14A:
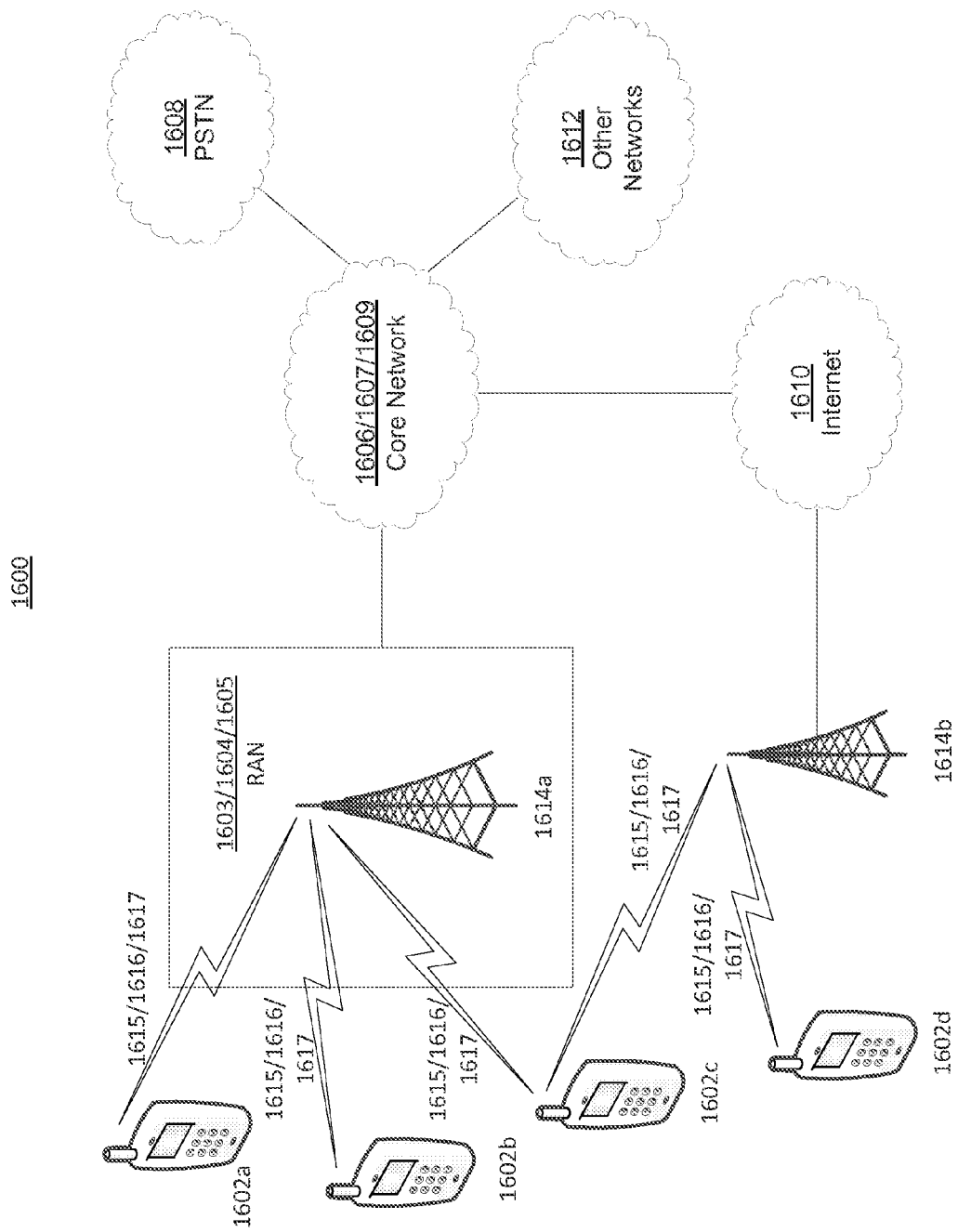
FIG. 14A is a system diagram of an example communications system in which one or more disclosed embodiments may be implemented.

FIG. 14A is a diagram of an example communications system 1600 in which one or more disclosed embodiments may be implemented. The communications system 1600 may be a multiple access system that provides content, such as voice, data, video, messaging, broadcast, etc., to multiple wireless users. The communications system 1600 may enable multiple wireless users to access such content through the sharing of system resources, including wireless bandwidth. For example, the communications systems 1600 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 14A, the communications system 1600 may include wireless transmit/receive units (WTRUs) 1602a, 1602b, 1602c, 1602d, a radio access network (RAN) 1603/1604/1605, a core network 1606/1607/1609, a public switched telephone network (PSTN) 1608, the Internet 1610, and other networks 1612, though it will be appreciated that the disclosed embodiments contemplate any number of WTRUs, base stations, networks, and/or network elements. Each of the WTRUs 1602a, 1602b, 1602c, 1602d may be any type of device configured to operate and/or communicate in a wireless environment. By way of example, the WTRUs 1602a, 1602b, 1602c, 1602d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, or any other terminal capable of receiving and processing compressed video communications.

The communications systems 1600 may also include a base station 1614a and a base station 1614b. Each of the base stations 1614a, 1614b may be any type of device configured to wirelessly interface with at least one of the WTRUs 1602a, 1602b, 1602c, 1602d to facilitate access to one or more communication networks, such as the core network 1606/1607/1609, the Internet 1610, and/or the networks 1612. By way of example, the base stations 1614a, 1614b may be a base transceiver station (BTS), a Node-B, an eNode B, a Home Node B, a Home eNode B, a site controller, an access point (AP), a wireless router, and the like. While the base stations 1614a, 1614b are each depicted as a single element, it will be appreciated that the base stations 1614a, 1614b may include any number of interconnected base stations and/or network elements.

The base station 1614a may be part of the RAN 1603/1604/1605, which may also include other base stations and/or network elements (not shown), such as a base station controller (BSC), a radio network controller (RNC), relay nodes, etc. The base station 1614a and/or the base station 1614b may be configured to transmit and/or receive wireless signals within a particular geographic region, which may be referred to as a cell (not shown). The cell may further be divided into cell sectors. For example, the cell associated with the base station 1614a may be divided into three sectors. Thus, in one embodiment, the base station 1614a may include three transceivers, i.e., one for each sector of the cell. In another embodiment, the base station 1614a may employ multiple-input multiple output (MIMO) technology and, therefore, may utilize multiple transceivers for each sector of the cell.

The base stations 1614a, 1614b may communicate with one or more of the WTRUs 1602a, 1602b, 1602c, 1602d over an air interface 1615/1616/1617, which may be any suitable wireless communication link (e.g., radio frequency (RF), microwave, infrared (IR), ultraviolet (UV), visible light, etc.). The air interface 1615/1616/1617 may be established using any suitable radio access technology (RAT).

More specifically, as noted above, the communications system 1600 may be a multiple access system and may employ one or more channel access schemes, such as CDMA, TDMA, FDMA, OFDMA, SC-FDMA, and the like. For example, the base station 1614a in the RAN 1603/1604/1605 and the WTRUs 1602a, 1602b, 1602c may implement a radio technology such as Universal Mobile Telecommunications System (UMTS) Terrestrial Radio Access (UTRA), which may establish the air interface 1615/1616/1617 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 1614a and the WTRUs 1602a, 1602b, 1602c may implement a radio technology such as Evolved UMTS Terrestrial Radio Access (E-UTRA), which may establish the air interface 1615/1616/1617 using Long Term Evolution (LTE) and/or LTE-Advanced (LTE-A).

In other embodiments, the base station 1614a and the WTRUs 1602a, 1602b, 1602c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1614b in FIG. 14A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 1614b and the WTRUs 1602c, 1602d may implement a radio technology such as IEEE 802.11 to establish a wireless local area network (WLAN). In another embodiment, the base station 1614b and the WTRUs 1602c, 1602d may implement a radio technology such as IEEE 802.15 to establish a wireless personal area network (WPAN). In yet another embodiment, the base station 1614b and the WTRUs 1602c, 1602d may utilize a cellular-based RAT (e.g., WCDMA, CDMA2000, GSM, LTE, LTE-A, etc.) to establish a picocell or femtocell. As shown in FIG. 14A, the base station 1614b may have a direct connection to the Internet 1610. Thus, the base station 1614b may not be required to access the Internet 1610 via the core network 1606/1607/1609.

The RAN 1603/1604/1605 may be in communication with the core network 1606, which may be any type of network configured to provide voice, data, applications, and/or voice over internet protocol (VoIP) services to one or more of the WTRUs 1602a, 1602b, 1602c, 1602d. For example, the core network 1606/1607/1609 may provide call control, billing services, mobile location-based services, pre-paid calling, Internet connectivity, video distribution, etc., and/or perform high-level security functions, such as user authentication. Although not shown in FIG. 14A, it will be appreciated that the RAN 1603/1604/1605 and/or the core network 1606/1607/1609 may be in direct or indirect communication with other RANs that employ the same RAT as the RAN 1603/1604/1605 or a different RAT. For example, in addition to being connected to the RAN 1603/1604/1605, which may be utilizing an E-UTRA radio technology, the core network 1606/1607/1609 may also be in communication with another RAN (not shown) employing a GSM radio technology.

The core network 1606/1607/1609 may also serve as a gateway for the WTRUs 1602a, 1602b, 1602c, 1602d to access the PSTN 1608, the Internet 1610, and/or other networks 1612. The PSTN 1608 may include circuit-switched telephone networks that provide plain old telephone service (POTS). The Internet 1610 may include a global system of interconnected computer networks and devices that use common communication protocols, such as the transmission control protocol (TCP), user datagram protocol (UDP) and the internet protocol (IP) in the TCP/IP internet protocol suite. The networks 1612 may include wired or wireless communications networks owned and/or operated by other service providers. For example, the networks 1612 may include another core network connected to one or more RANs, which may employ the same RAT as the RAN 1603/1604/1605 or a different RAT.

Some or all of the WTRUs 1602a, 1602b, 1602c, 1602d in the communications system 1600 may include multi-mode capabilities, i.e., the WTRUs 1602a, 1602b, 1602c, 1602d may include multiple transceivers for communicating with different wireless networks over different wireless links. For example, the WTRU 1602c shown in FIG. 14A may be configured to communicate with the base station 1614a, which may employ a cellular-based radio technology, and with the base station 1614b, which may employ an IEEE 802 radio technology.

Figure 14B:
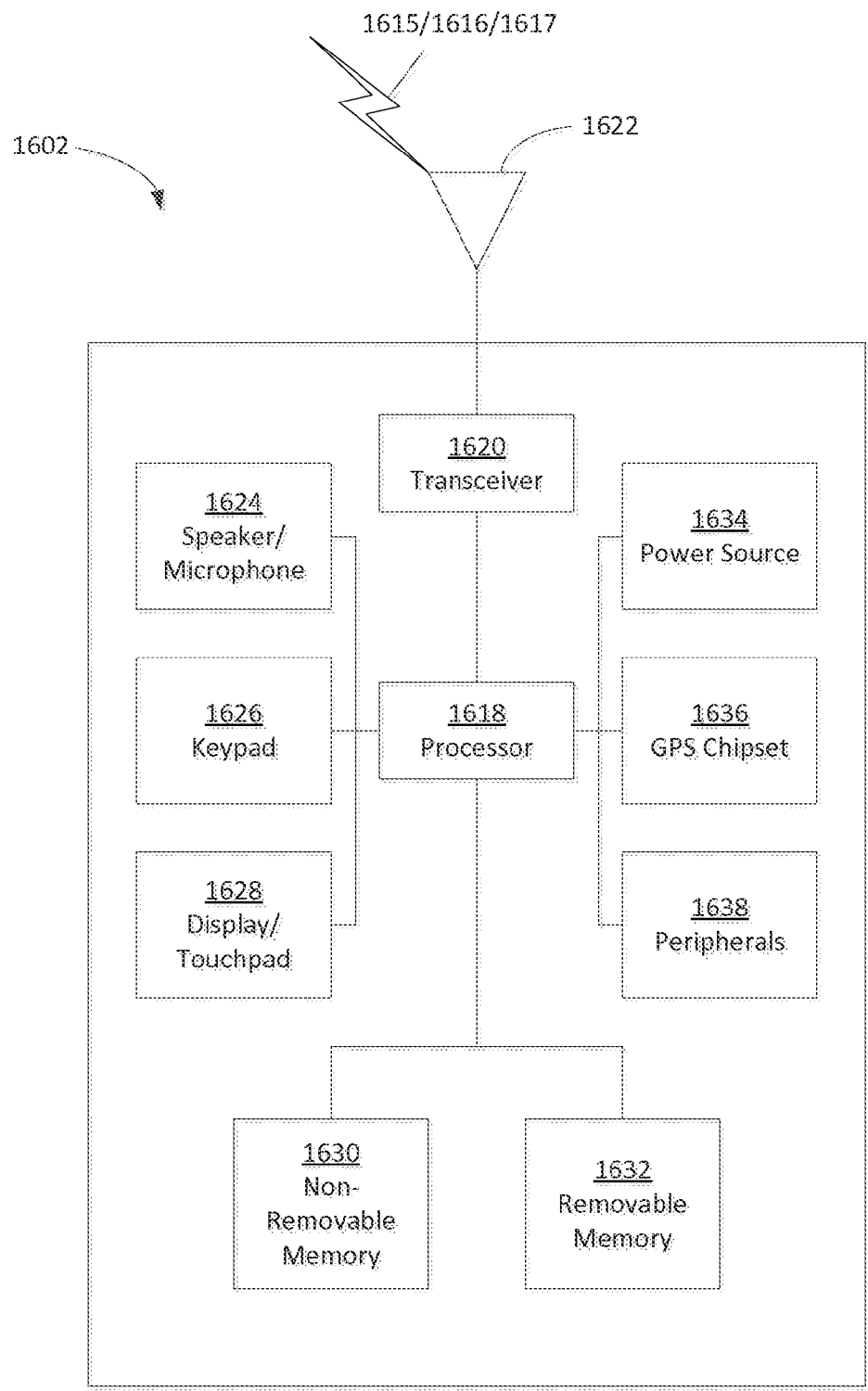
FIG. 14B is a system diagram of an example wireless transmit/receive unit (WTRU) that may be used within the communications system illustrated in FIG. 14A.

FIG. 14B is a system diagram of an example WTRU 1602. As shown in FIG. 14B, the WTRU 1602 may include a processor 1618, a transceiver 1620, a transmit/receive element 1622, a speaker/microphone 1624, a keypad 1626, a display/touchpad 1628, non-removable memory 1630, removable memory 1632, a power source 1634, a global positioning system (GPS) chipset 1636, and other peripherals 1638. It will be appreciated that the WTRU 1602 may include any sub-combination of the foregoing elements while remaining consistent with an embodiment. Also, embodiments contemplate that the base stations 1614a and 1614b, and/or the nodes that base stations 1614a and 1614b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 14B and described herein.

The processor 1618 may be a general purpose processor, a special purpose processor, a conventional processor, a digital signal processor (DSP), a graphics processing unit (GPU), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1618 may perform signal coding, data processing, power control, input/output processing, and/or any other functionality that enables the WTRU 1602 to operate in a wireless environment. The processor 1618 may be coupled to the transceiver 1620, which may be coupled to the transmit/receive element 1622. While FIG. 14B depicts the processor 1618 and the transceiver 1620 as separate components, it will be appreciated that the processor 1618 and the transceiver 1620 may be integrated together in an electronic package or chip.

The transmit/receive element 1622 may be configured to transmit signals to, or receive signals from, a base station (e.g., the base station 1614a) over the air interface 1615/1616/1617. For example, in one embodiment, the transmit/receive element 1622 may be an antenna configured to transmit and/or receive RF signals. In another embodiment, the transmit/receive element 1622 may be an emitter/detector configured to transmit and/or receive IR, UV, or visible light signals, for example. In yet another embodiment, the transmit/receive element 1622 may be configured to transmit and receive both RF and light signals. It will be appreciated that the transmit/receive element 1622 may be configured to transmit and/or receive any combination of wireless signals.

In addition, although the transmit/receive element 1622 is depicted in FIG. 14B as a single element, the WTRU 1602 may include any number of transmit/receive elements 1622. More specifically, the WTRU 1602 may employ MIMO technology. Thus, in one embodiment, the WTRU 1602 may include two or more transmit/receive elements 1622 (e.g., multiple antennas) for transmitting and receiving wireless signals over the air interface 1615/1616/1617.

The transceiver 1620 may be configured to modulate the signals that are to be transmitted by the transmit/receive element 1622 and to demodulate the signals that are received by the transmit/receive element 1622. As noted above, the WTRU 1602 may have multi-mode capabilities. Thus, the transceiver 1620 may include multiple transceivers for enabling the WTRU 1602 to communicate via multiple RATs, such as UTRA and IEEE 802.11, for example.

The processor 1618 of the WTRU 1602 may be coupled to, and may receive user input data from, the speaker/microphone 1624, the keypad 1626, and/or the display/touchpad 1628 (e.g., a liquid crystal display (LCD) display unit or organic light-emitting diode (OLED) display unit). The processor 1618 may also output user data to the speaker/microphone 1624, the keypad 1626, and/or the display/touchpad 1628. In addition, the processor 1618 may access information from, and store data in, any type of suitable memory, such as the non-removable memory 1630 and/or the removable memory 1632. The non-removable memory 1630 may include random-access memory (RAM), read-only memory (ROM), a hard disk, or any other type of memory storage device. The removable memory 1632 may include a subscriber identity module (SIM) card, a memory stick, a secure digital (SD) memory card, and the like. In other embodiments, the processor 1618 may access information from, and store data in, memory that is not physically located on the WTRU 1602, such as on a server or a home computer (not shown).

The processor 1618 may receive power from the power source 1634, and may be configured to distribute and/or control the power to the other components in the WTRU 1602. The power source 1634 may be any suitable device for powering the WTRU 1602. For example, the power source 1634 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1618 may also be coupled to the GPS chipset 1636, which may be configured to provide location information (e.g., longitude and latitude) regarding the current location of the WTRU 1602. In addition to, or in lieu of, the information from the GPS chipset 1636, the WTRU 1602 may receive location information over the air interface 1615/1616/1617 from a base station (e.g., base stations 1614a, 1614b) and/or determine its location based on the timing of the signals being received from two or more nearby base stations. It will be appreciated that the WTRU 1602 may acquire location information by way of any suitable location-determination method while remaining consistent with an embodiment.

The processor 1618 may further be coupled to other peripherals 1638, which may include one or more software and/or hardware modules that provide additional features, functionality and/or wired or wireless connectivity. For example, the peripherals 1638 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 14C:
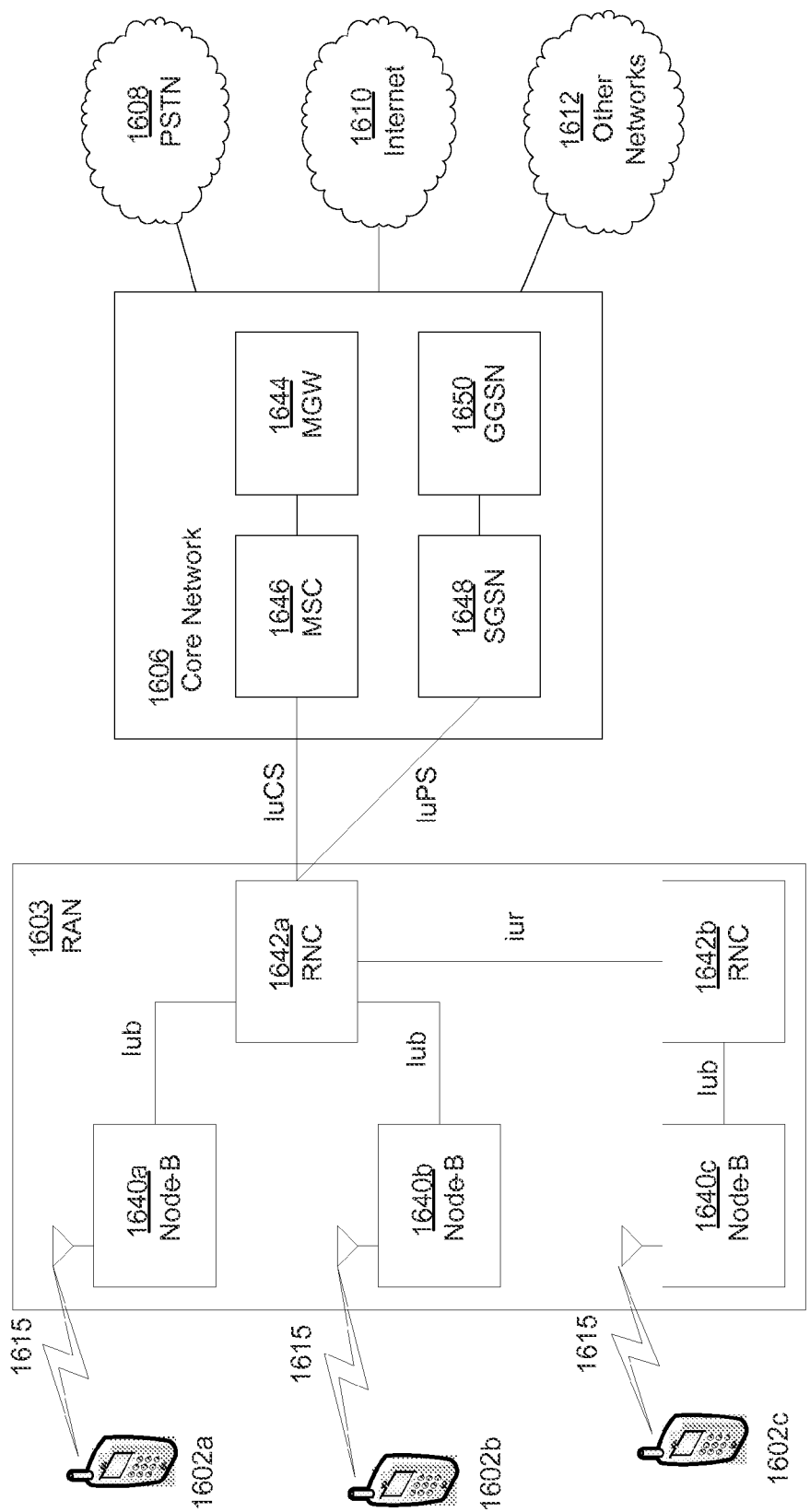
FIG. 14C is a system diagram of an example radio access network and an example core network that may be used within the communications system illustrated in FIG. 14A.

FIG. 14C is a system diagram of the RAN 1603 and the core network 1606 according to an embodiment. As noted above, the RAN 1603 may employ a UTRA radio technology to communicate with the WTRUs 1602a, 1602b, 1602c over the air interface 1615. The RAN 1604 may also be in communication with the core network 1606. As shown in FIG. 14C, the RAN 1603 may include Node-Bs 1640a, 1640b, 1640c, which may each include one or more transceivers for communicating with the WTRUs 1602a, 1602b, 1602c over the air interface 1615. The Node-Bs 1640a, 1640b, 1640c may each be associated with a particular cell (not shown) within the RAN 1603. The RAN 1603 may also include RNCs 1642a, 1642b. It will be appreciated that the RAN 1603 may include any number of Node-Bs and RNCs while remaining consistent with an embodiment.

As shown in FIG. 14C, the Node-Bs 1640a, 1640b may be in communication with the RNC 1642a. Additionally, the Node-B 1640c may be in communication with the RNC 1642b. The Node-Bs 1640a, 1640b, 1640c may communicate with the respective RNCs 1642a, 1642b via an Iub interface. The RNCs 1642a, 1642b may be in communication with one another via an Iur interface. Each of the RNCs 1642a, 1642b may be configured to control the respective Node-Bs 1640a, 1640b, 1640c to which it is connected. In addition, each of the RNCs 1642a, 1642b may be configured to carry out or support other functionality, such as outer loop power control, load control, admission control, packet scheduling, handover control, macrodiversity, security functions, data encryption, and the like.

The core network 1606 shown in FIG. 14C may include a media gateway (MGW) 1644, a mobile switching center (MSC) 1646, a serving GPRS support node (SGSN) 1648, and/or a gateway GPRS support node (GGSN) 1650. While each of the foregoing elements are depicted as part of the core network 1606, it will be appreciated that any one of these elements may be owned and/or operated by an entity other than the core network operator.

The RNC 1642a in the RAN 1603 may be connected to the MSC 1646 in the core network 1606 via an IuCS interface. The MSC 1646 may be connected to the MGW 1644. The MSC 1646 and the MGW 1644 may provide the WTRUs 1602a, 1602b, 1602c with access to circuit-switched networks, such as the PSTN 1608, to facilitate communications between the WTRUs 1602a, 1602b, 1602c and traditional land-line communications devices.

The RNC 1642a in the RAN 1603 may also be connected to the SGSN 1648 in the core network 1606 via an IuPS interface. The SGSN 1648 may be connected to the GGSN 1650. The SGSN 1648 and the GGSN 1650 may provide the WTRUs 1602a, 1602b, 1602c with access to packet-switched networks, such as the Internet 1610, to facilitate communications between and the WTRUs 1602a, 1602b, 1602c and IP-enabled devices.

As noted above, the core network 1606 may also be connected to the networks 1612, which may include other wired or wireless networks that are owned and/or operated by other service providers.

Figure 14D:
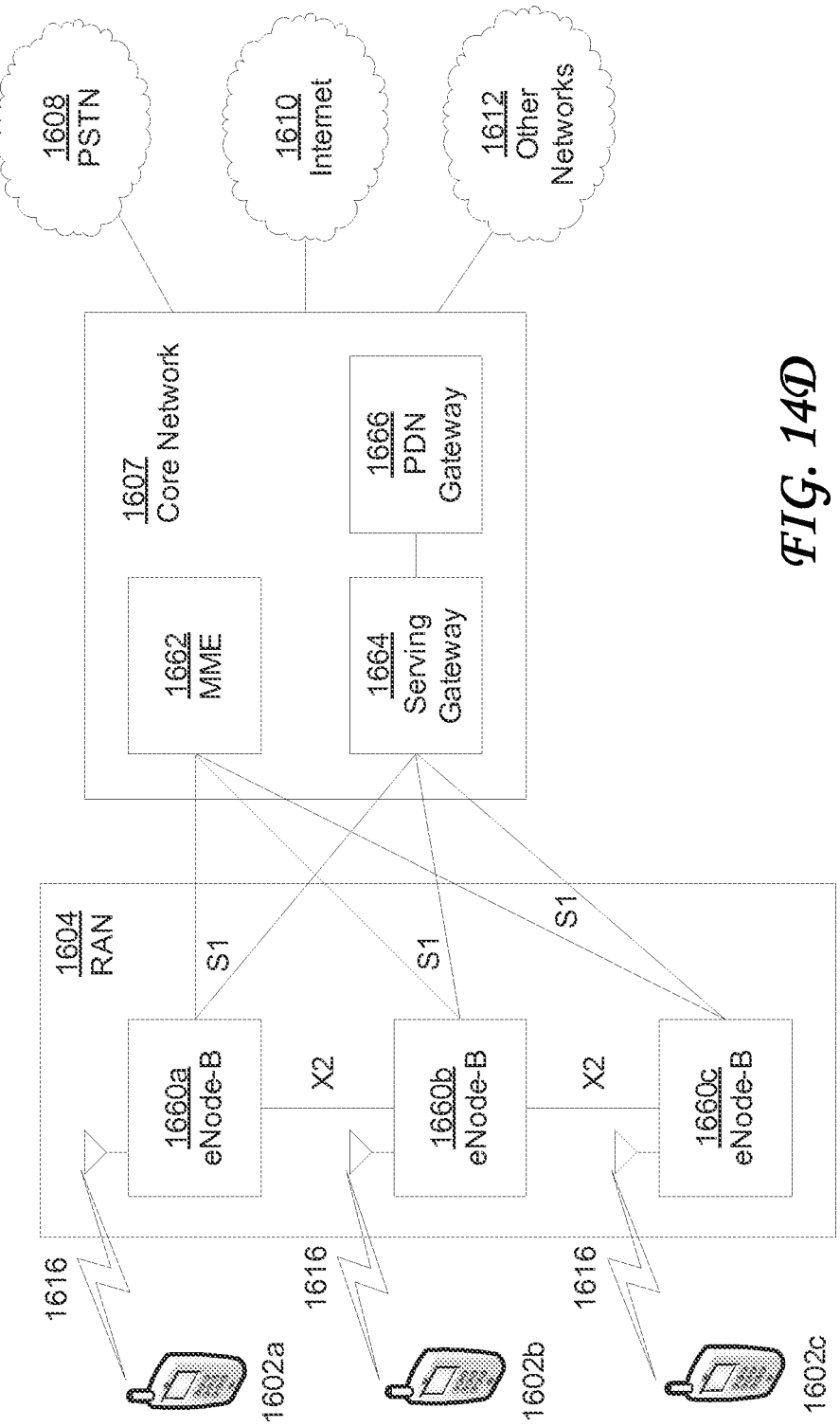
FIG. 14D is a system diagram of another example radio access network and another example core network that may be used within the communications system illustrated in FIG. 14A.

FIG. 14D is a system diagram of the RAN 1604 and the core network 1607 according to another embodiment. As noted above, the RAN 1604 may employ an E-UTRA radio technology to communicate with the WTRUs 1602a, 1602b, 1602c over the air interface 1616. The RAN 1604 may also be in communication with the core network 1607.

The RAN 1604 may include eNode-Bs 1660a, 1660b, 1660c, though it will be appreciated that the RAN 1604 may include any number of eNode-Bs while remaining consistent with an embodiment. The eNode-Bs 1660a, 1660b, 1660c may each include one or more transceivers for communicating with the WTRUs 1602a, 1602b, 1602c over the air interface 1616. In one embodiment, the eNode-Bs 1660a, 1660b, 1660c may implement MIMO technology. Thus, the eNode-B 1660a, for example, may use multiple antennas to transmit wireless signals to, and receive wireless signals from, the WTRU 1602a.

Each of the eNode-Bs 1660a, 1660b, 1660c may be associated with a particular cell (not shown) and may be configured to handle radio resource management decisions, handover decisions, scheduling of users in the uplink and/or downlink, and the like. As shown in FIG. 14D, the eNode-Bs 1660a, 1660b, 1660c may communicate with one another over an X2 interface.

The core network 1607 shown in FIG. 14D may include a mobility management gateway (MME) 1662, a serving gateway 1664, and a packet data network (PDN) gateway 1666. While each of the foregoing elements are depicted as part of the core network 1607, it will be appreciated that any one of these elements may be owned and/or operated by an entity other than the core network operator.

The MME 1662 may be connected to each of the eNode-Bs 1660a, 1660b, 1660c in the RAN 1604 via an S1 interface and may serve as a control node. For example, the MME 1662 may be responsible for authenticating users of the WTRUs 1602a, 1602b, 1602c, bearer activation/deactivation, selecting a particular serving gateway during an initial attach of the WTRUs 1602a, 1602b, 1602c, and the like. The MME 1662 may also provide a control plane function for switching between the RAN 1604 and other RANs (not shown) that employ other radio technologies, such as GSM or WCDMA.

The serving gateway 1664 may be connected to each of the eNode Bs 1660a, 1660b, 1660c in the RAN 1604 via the S1 interface. The serving gateway 1664 may generally route and forward user data packets to/from the WTRUs 1602a, 1602b, 1602c. The serving gateway 1664 may also perform other functions, such as anchoring user planes during inter-eNode B handovers, triggering paging when downlink data is available for the WTRUs 1602a, 1602b, 1602c, managing and storing contexts of the WTRUs 1602a, 1602b, 1602c, and the like.

The serving gateway 1664 may also be connected to the PDN gateway 1666, which may provide the WTRUs 1602a, 1602b, 1602c with access to packet-switched networks, such as the Internet 1610, to facilitate communications between the WTRUs 1602a, 1602b, 1602c and IP-enabled devices.

The core network 1607 may facilitate communications with other networks. For example, the core network 1607 may provide the WTRUs 1602a, 1602b, 1602c with access to circuit-switched networks, such as the PSTN 1608, to facilitate communications between the WTRUs 1602a, 1602b, 1602c and traditional land-line communications devices. For example, the core network 1607 may include, or may communicate with, an IP gateway (e.g., an IP multimedia subsystem (IMS) server) that serves as an interface between the core network 1607 and the PSTN 1608. In addition, the core network 1607 may provide the WTRUs 1602a, 1602b, 1602c with access to the networks 1612, which may include other wired or wireless networks that are owned and/or operated by other service providers.

Figure 14E:
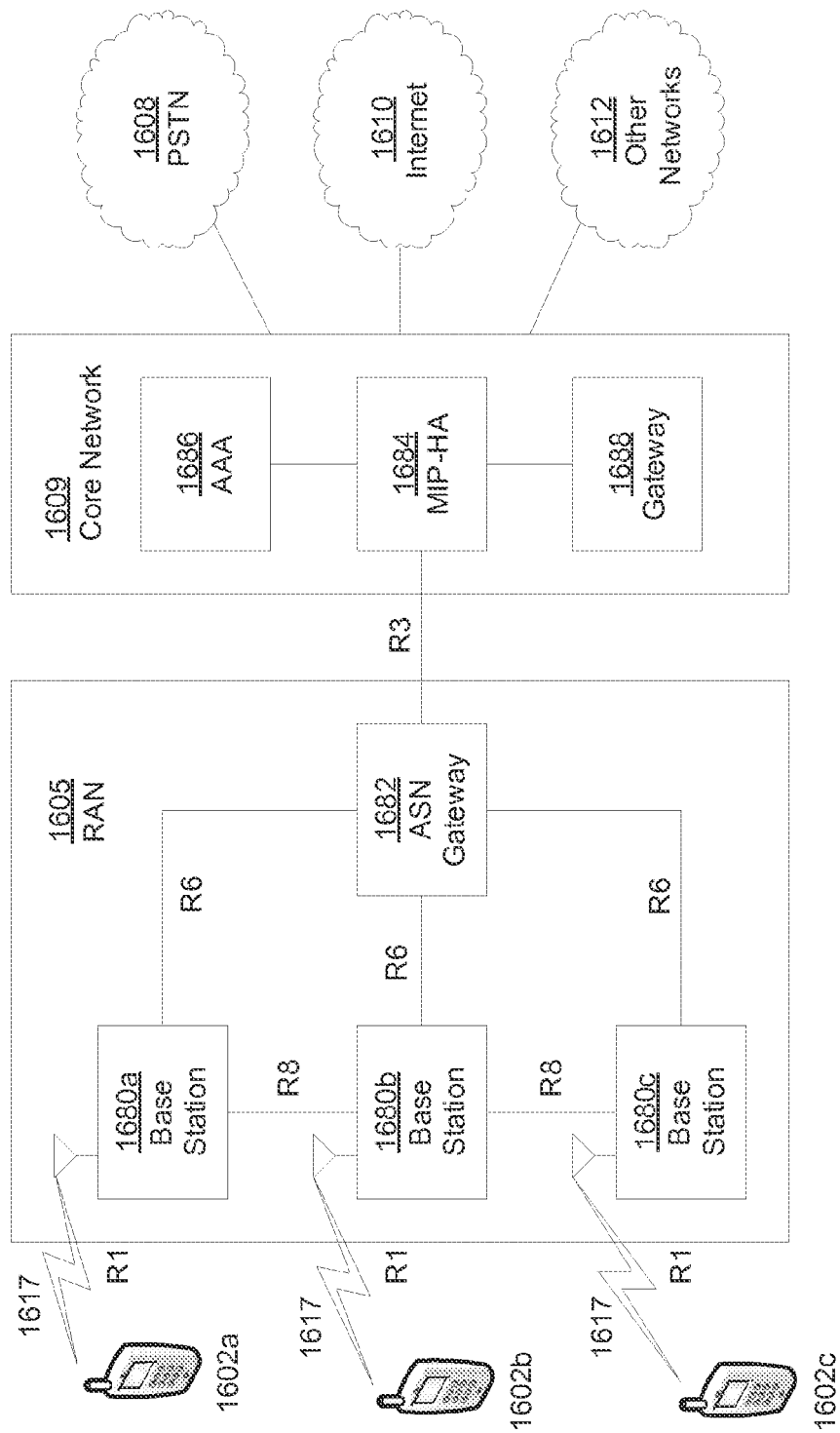
FIG. 14E is a system diagram of another example radio access network and another example core network that may be used within the communications system illustrated in FIG. 14A.

FIG. 14E is a system diagram of the RAN 1605 and the core network 1609 according to another embodiment. The RAN 1605 may be an access service network (ASN) that employs IEEE 802.16 radio technology to communicate with the WTRUs 1602a, 1602b, 1602c over the air interface 1617. As will be further discussed below, the communication links between the different functional entities of the WTRUs 1602a, 1602b, 1602c, the RAN 1605, and the core network 1609 may be defined as reference points.

As shown in FIG. 14E, the RAN 1605 may include base stations 1680a, 1680b, 1680c, and an ASN gateway 1682, though it will be appreciated that the RAN 1605 may include any number of base stations and ASN gateways while remaining consistent with an embodiment. The base stations 1680a, 1680b, 1680c may each be associated with a particular cell (not shown) in the RAN 1605 and may each include one or more transceivers for communicating with the WTRUs 1602a, 1602b, 1602c over the air interface 1617. In one embodiment, the base stations 1680a, 1680b, 1680c may implement MIMO technology. Thus, the base station 1680a, for example, may use multiple antennas to transmit wireless signals to, and receive wireless signals from, the WTRU 1602a. The base stations 1680a, 1680b, 1680c may also provide mobility management functions, such as handoff triggering, tunnel establishment, radio resource management, traffic classification, quality of service (QoS) policy enforcement, and the like. The ASN gateway 1682 may serve as a traffic aggregation point and may be responsible for paging, caching of subscriber profiles, routing to the core network 1609, and the like.

The air interface 1617 between the WTRUs 1602a, 1602b, 1602c and the RAN 1605 may be defined as an R1 reference point that implements the IEEE 802.16 specification. In addition, each of the WTRUs 1602a, 1602b, 1602c may establish a logical interface (not shown) with the core network 1609. The logical interface between the WTRUs 1602a, 1602b, 1602c and the core network 1609 may be defined as an R2 reference point, which may be used for authentication, authorization, IP host configuration management, and/or mobility management.

The communication link between each of the base stations 1680a, 1680b, 1680c may be defined as an R8 reference point that includes protocols for facilitating WTRU handover and the transfer of data between base stations. The communication link between the base stations 190a, 1680b, 1680c and the ASN gateway 1682 may be defined as an R6 reference point. The R6 reference point may include protocols for facilitating mobility management based on mobility events associated with each of the WTRUs 1602a, 1602b, 1602c.

As shown in FIG. 14E, the RAN 1605 may be connected to the core network 1609. The communication link between the RAN 1605 and the core network 1609 may defined as an R3 reference point that includes protocols for facilitating data transfer and mobility management capabilities, for example. The core network 1609 may include a mobile IP home agent (MIP-HA) 1684, an authentication, authorization, accounting (AAA) server 1686, and a gateway 1688. While each of the foregoing elements are depicted as part of the core network 1609, it will be appreciated that any one of these elements may be owned and/or operated by an entity other than the core network operator.

The MIP-HA 1684 may be responsible for IP address management, and may enable the WTRUs 1602a, 1602b, 1602c to roam between different ASNs and/or different core networks. The MIP-HA 1684 may provide the WTRUs 1602a, 1602b, 1602c with access to packet-switched networks, such as the Internet 1610, to facilitate communications between the WTRUs 1602a, 1602b, 1602c and IP-enabled devices. The AAA server 1686 may be responsible for user authentication and for supporting user services. The gateway 1688 may facilitate interworking with other networks. For example, the gateway 1688 may provide the WTRUs 1602a, 1602b, 1602c with access to circuit-switched networks, such as the PSTN 1608, to facilitate communications between the WTRUs 1602a, 1602b, 1602c and traditional land-line communications devices. In addition, the gateway 1688 may provide the WTRUs 1602a, 1602b, 1602c with access to the networks 1612, which may include other wired or wireless networks that are owned and/or operated by other service providers.

Although not shown in FIG. 14E, it will be appreciated that the RAN 1605 may be connected to other ASNs and the core network 1609 may be connected to other core networks. The communication link between the RAN 1605 the other ASNs may be defined as an R4 reference point, which may include protocols for coordinating the mobility of the WTRUs 1602a, 1602b, 1602c between the RAN 1605 and the other ASNs. The communication link between the core network 1609 and the other core networks may be defined as an R5 reference, which may include protocols for facilitating interworking between home core networks and visited core networks.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

The invention claimed is:

1. A method comprising:
receiving a first frame of a video stream and a second frame of the video stream;
determining if a chroma component of a pixel associated with the first frame is within a predefined region of chrominance color space;
determining if a chroma component of a co-located pixel in the second frame is within the predefined region of chrominance color space;
determining a distance (r) between the co-located pixel and a nearest pixel in the second frame that is not within the predefined region of chrominance color space; and
applying a temporal denoising filter to the pixel if the chroma component of the pixel is within the predefined region of chrominance color space and the chroma component of the co-located pixel is within the predefined region of chrominance color space, wherein the temporal denoising filter is applied to the pixel associated with the first frame as a function of the distance (r).

2. The method of claim 1, wherein the temporal denoising filter is applied to the pixel as a function of the distance (r).

3. The method of claim 1, further comprising encoding the video stream after applying the temporal denoising filter.

4. The method of claim 1, wherein the second frame is received prior to the first frame.

5. The method of claim 1, wherein the predefined region of chrominance color space is a CbCr space.

6. The method of claim 5, wherein the predefined region of chrominance color space is defined by limiting a minimum value of Cb.

7. The method of claim 1, wherein the predefined region of chrominance color space is associated with a color defined by limiting a value of Cb to a first range and limiting a value of Cr to a second range.

8. A video device, comprising:
a processor configured to:
receive a first frame of a video stream and a second frame of the video stream;
determine if a chroma component of a pixel associated with the first frame is within a predefined region of chrominance color space;
determine if a chroma component of a co-located pixel in the second frame is within the predefined region of chrominance color space;
determine a distance (r) between the co-located pixel and a nearest pixel in the second frame that is not within the predefined region of chrominance color space; and
apply a temporal denoising filter to the pixel if the chroma component of the pixel is within the predefined region of chrominance color space and the chroma component of the co-located pixel is within the predefined region of chrominance color space wherein the temporal denoising filter is applied to the pixel associated with the first frame as a function of the distance (r).

9. The video device of claim 8, wherein the temporal denoising filter is applied to the pixel as a function of the distance (r).

10. The video device of claim 8, wherein the processor is further configured to encode the video stream after applying the temporal denoising filter.

11. The video device of claim 8, wherein the second frame is received prior to the first frame.

12. The video device of claim 8, wherein the predefined region of chrominance color space is a CbCr space.

13. The video device of claim 12, wherein the predefined region of chrominance color space is defined by limiting a minimum value of Cb.

14. The video device of claim 8, wherein the predefined region of chrominance color space is associated with a color defined by limiting a value of Cb to a first range and limiting a value of Cr to a second range.

* * * * *